United States Patent
Kashiwagi et al.

(10) Patent No.: US 11,221,047 B2
(45) Date of Patent: Jan. 11, 2022

(54) CONSTANT VELOCITY JOINT

(71) Applicants: JTEKT Corporation, Osaka (JP); TOYOTA JIDOSHA KABUSHIKI KAISHA, Toyota (JP)

(72) Inventors: Isashi Kashiwagi, Kariya (JP); Masahito Ikeo, Kariya (JP); Yoshitaka Shinoda, Nagakute (JP); Hideki Sugiura, Nagakute (JP)

(73) Assignees: JTEKT Corporation, Osaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 326 days.

(21) Appl. No.: 16/374,996

(22) Filed: Apr. 4, 2019

(65) Prior Publication Data
US 2019/0309800 A1 Oct. 10, 2019

(30) Foreign Application Priority Data
Apr. 4, 2018 (JP) ............................. JP2018-072113

(51) Int. Cl.
*F16D 3/223* (2011.01)

(52) U.S. Cl.
CPC .... *F16D 3/223* (2013.01); *F16D 2003/22303* (2013.01); *F16D 2003/22306* (2013.01); *Y10S 464/906* (2013.01)

(58) Field of Classification Search
CPC ........... F16D 3/223; F16D 2003/22303; F16D 2003/22306; F16D 2003/22309; F16D 3/2237; Y10S 464/906
See application file for complete search history.

(56) References Cited

U.S. PATENT DOCUMENTS

| | | | | |
|---|---|---|---|---|
| 3,447,341 A * | 6/1969 | Miller, Jr. | ........... | F16C 33/3887 |
| | | | | 464/145 |
| 6,241,615 B1 * | 6/2001 | Jacob | ..................... | F16D 3/2237 |
| | | | | 464/145 |
| 7,591,730 B2 * | 9/2009 | Schwarzler | ............. | F16D 3/224 |
| | | | | 464/145 |
| 2004/0137991 A1 | 7/2004 | Weckerling | | |
| 2007/0111806 A1 | 5/2007 | Weckerling | | |
| 2019/0309801 A1 * | 10/2019 | Kashiwagi | ........... | F16D 3/2237 |

FOREIGN PATENT DOCUMENTS

| | | |
|---|---|---|
| JP | 06-42545 | 2/1994 |
| JP | 2004-169915 | 6/2004 |
| JP | 4401745 | 11/2009 |
| JP | 5074194 | 8/2012 |

* cited by examiner

*Primary Examiner* — Greg Binda
(74) *Attorney, Agent, or Firm* — Oblon, McClelland, Maier & Neustadt, L.L.P.

(57) ABSTRACT

A joint-center-fixed constant velocity joint configured to be provided in a vehicle includes an outer joint member, an inner joint member, a first ball, a second ball, and a cage. While a center of the first ball is moving to a position of the maximum use angle on an opening side from a joint center, a first open angle faces the opening side. While a center of the second ball is moving to a position of the maximum use angle on a bottom side from the joint center, a second open angle is not reversed from a state where the second open angle faces the bottom side to a state where the second open angle faces the opening side.

13 Claims, 13 Drawing Sheets

CONSTANT VELOCITY JOINT

INCORPORATION BY REFERENCE

The disclosure of Japanese Patent Application No. 2018-072113 filed on Apr. 4, 2018 including the specification, drawings and abstract is incorporated herein by reference in its entirety.

BACKGROUND

1. Technical Field

The present disclosure relates to a constant velocity joint.

2. Description of Related Art

There has been known a joint-center-fixed constant velocity joint including: a bottomed tubular outer joint member; an inner joint member placed inwardly from the outer joint member; a plurality of balls placed between a plurality of outer ball grooves formed in the outer joint member and a plurality of inner ball grooves formed in the inner joint member; and a cage configured to hold the balls. The ball is rotatably supported by the rolling contact surface of the outer ball groove and the rolling contact surface of the inner ball groove, so as to transmit a torque between the outer joint member and the inner joint member.

Further, in terms of the constant velocity joint in the related art, there has been known such a technique that the outer ball grooves are formed in the same ball groove shape, the inner ball grooves are formed in the same ball groove shape, and the ball-groove centers of the outer ball grooves and the ball-groove centers of the inner ball grooves are offset to the opposite directions to each other across the joint center. In such a constant velocity joint, as a force is applied so as to push the balls toward the opening side of the outer joint member, the cage holding the balls is to move toward the opening side of the outer joint member. At this time, frictions are caused between the cage and an inner peripheral surface of the outer joint member and between the cage and an outer peripheral surface of the inner joint member, thereby causing a mechanical loss at the time of performing torque transmission between the outer joint member and the inner joint member.

In this regard, Japanese Unexamined Patent Application Publication No. 2004-169915 (JP 2004-169915 A) describes a constant velocity joint in which a plurality of outer ball grooves is formed such that the outer ball grooves having different ball groove shapes are provided alternately and a plurality of inner ball grooves is formed such that the inner ball grooves having different ball groove shapes are provided alternately. In the constant velocity joint, when the joint angle is zero degrees, a first ball placed between a first outer ball groove and a first inner ball groove receives a force to move the first ball toward the opening side of an outer joint member. In the meantime, a second ball placed between a second outer ball groove and a second inner ball groove receives a force to move the second ball toward the bottom side of the outer joint member. As a result, the force applied to the first ball and the force applied to the second ball cancel each other, so that frictions to be caused between a cage and an inner peripheral surface of the outer joint member and between the cage and an outer peripheral surface of an inner joint member are restrained.

SUMMARY

However, in the constant velocity joint described in JP 2004-169915 A, when the second ball greatly moves to the bottom side of the outer joint member, the direction of the force applied to the second ball is reversed. That is, the constant velocity joint in the related art has such a problem that, when the joint angle increases it is difficult to restrain frictions to be caused between the cage and the inner peripheral surface of the outer joint member and between the cage and the outer peripheral surface of the inner joint member.

One aspect of the present disclosure provides a constant velocity joint that is able to restrain frictions to be caused between a cage and an inner peripheral surface of an outer joint member and between the cage and an outer peripheral surface of an inner joint member even if the joint angle is large.

A constant velocity joint according to a first aspect of the present disclosure is a joint-center-fixed constant velocity joint configured to be provided in a vehicle, and includes an outer joint member, an inner joint member, a first ball, a second ball, and a cage. The outer joint member has a bottomed tubular shape opened on one side in the central-axis direction and includes an inner peripheral surface having a first outer ball groove and a second outer ball groove. The inner joint member is placed inwardly from the outer joint member and includes an outer peripheral surface having a first inner ball groove corresponding to the first outer ball groove and a second inner ball groove corresponding to the second outer ball groove. The first ball is placed between the first outer ball groove and the first inner ball groove. The second ball is placed between the second outer ball groove and the second inner ball groove. The cage is placed between the inner peripheral surface of the outer joint member and the outer peripheral surface of the inner joint member and includes a plurality of window portions in each of which a corresponding one of the first ball and the second ball is accommodated.

A maximum joint angle of the constant velocity joint used in a state where the constant velocity joint is provided in the vehicle is defined as a maximum use angle. An angle formed between a center locus of the first ball rolling on the first outer ball groove and a center locus of the first ball rolling on the first inner ball groove is defined as a first open angle, the first open angle being on the side where a distance between the first outer ball groove and the first inner ball groove expands. An angle formed between a center locus of the second ball rolling on the second outer ball groove and a center locus of the second ball rolling on the second inner ball groove is defined as a second open angle, the second open angle being on the side where a distance between the second outer ball groove and the second inner ball groove expands.

When the center of the first ball is placed at the same position as the joint center in the central-axis direction of the outer joint member, the first open angle faces the opening side of the outer joint member. While the center of the first ball is moving to a position of the maximum use angle on the opening side of the outer joint member from the joint center, the first open angle faces the opening side of the outer joint member. When the center of the second ball is placed at the same position as the joint center in the central-axis direction of the outer joint member, the second open angle faces the bottom side of the outer joint member. While the center of the second ball is moving to a position of the maximum use angle on the bottom side of the outer joint member from the joint center, the second open angle is not reversed from a state where the second open angle faces the bottom side of the outer joint member to a state where the second open angle faces the opening side of the outer joint member.

In the constant velocity joint of the present disclosure, while the center of the second ball is moving to the position of the maximum use angle on the bottom side of the outer joint member from the joint center, it is possible to prevent a force applied to the second ball from being reversed from a state where the force is directed toward the bottom side of the outer joint member to a state where the force is directed toward the opening side thereof. Accordingly, with the constant velocity joint of the present disclosure, even if the joint angle is large in a state where the constant velocity joint is provided in the vehicle, it is possible to restrain frictions to be caused between the cage and the inner peripheral surface of the outer joint member and between the cage and the outer peripheral surface of the inner joint member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. First Embodiment

The following describes an embodiment to which a constant velocity joint of the present disclosure is applied, with reference to the drawings. First described is a constant velocity joint 100 in the first embodiment of the present disclosure with reference to FIGS. 1 to 6. The constant velocity joint 100 is a joint-center-fixed constant velocity joint configured to be provided in a vehicle (not shown) and is preferably used as an outboard joint for a front drive shaft.

Figure 1:
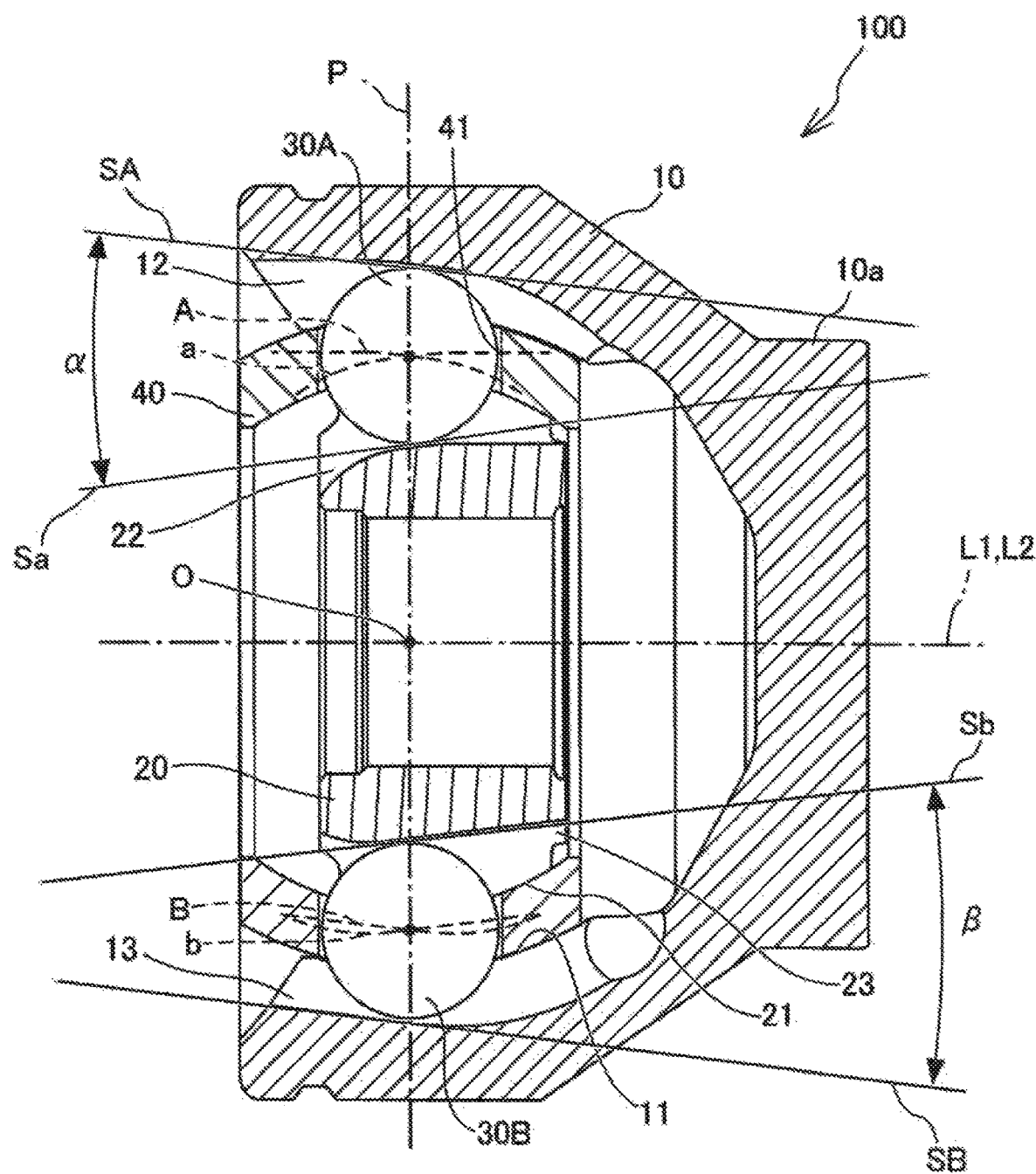
FIG. 1 is a view illustrating an axial section of a constant velocity joint in a first embodiment of the present disclosure.

The following describes a schematic configuration of the constant velocity joint 100. As illustrated in FIG. 1, the constant velocity joint 100 mainly includes an outer joint member 10, an inner joint member 20, first balls 30A, second balls 30B, and a cage 40.

The outer joint member 10 has a bottomed tubular shape opened on a first side (the left side in FIG. 1) in the central-axis-L1 direction. The outer joint member 10 includes an inner peripheral surface 11 having a recessed spherical shape, and first outer ball grooves 12 and second outer ball grooves 13 formed on the inner peripheral surface 11. The bottom of the outer joint member 10 includes a connecting shaft 10a formed integrally therewith so as to extend toward a second side (the right side in FIG. 1) in the central-axis-L1 direction. The connecting shaft 10a is connected to another power transmission shaft (not shown). The first outer ball grooves 12 and the second outer ball grooves 13 are formed in a groove shape extending in the central-axis-L1 direction of the outer joint member 10. The outer joint member 10 is configured such that three first outer ball grooves 12 and three second outer ball grooves 13 are formed alternately in the circumferential direction.

The inner joint member 20 is formed in an annular shape. The inner joint member 20 includes an outer peripheral surface 21 having a projecting spherical shape, and first inner ball grooves 22 and second inner ball grooves 23 formed on the outer peripheral surface 21 of the inner joint member 20. The first inner ball grooves 22 and the second inner ball grooves 23 are formed in a groove shape extending in the central-axis-L2 direction of the inner joint member 20. The inner joint member 20 is configured such that three first inner ball grooves 22 and three second inner ball grooves 23 are formed alternately in the circumferential direction. The first inner ball groove 22 corresponds to the first outer ball groove 12, and the second inner ball groove 23 corresponds to the second outer ball groove 13. The inner joint member 20 is placed inwardly from the outer joint member 10 such that the first inner ball groove 22 and the first outer ball groove 12 are placed so as to face each other, and the second inner ball groove 23 and the second outer ball groove 13 are placed so as to face each other.

The first ball 30A and the second ball 30B transmit a torque between the outer joint member 10 and the inner joint member 20. The first ball 30A is rotatably placed between the first outer ball groove 12 and the first inner ball groove 22, and the second ball 30B is rotatably placed between the second outer ball groove 13 and the second inner ball groove 23. The inner joint member 20 rolls the first ball 30A and the second ball 30B, and rotates relative to the outer joint member 10 around the joint center O. That is, the inner joint member 20 can have an angle (a joint angle) with respect to the outer joint member 10.

The cage 40 is placed between the inner peripheral surface 11 of the outer joint member 10 and the outer peripheral surface 21 of the inner joint member 20. The cage 40 includes six window portions 41 in each of which a corresponding one of the three first balls 30A and the three second balls 30B can be accommodated. The cage 40 rotates around the joint center O along with rolling of the first ball 30A and the second ball 30B.

Here, an angle formed between a center locus A of the first ball 30A rolling on the first outer ball groove 12 and a center locus a of the first ball 30A rolling on the first inner ball groove 22 is defined as a first open angle α, the first open angle α being on the side where a distance between the first outer ball groove 12 and the first inner ball groove 22 expands. Further, an angle formed between a center locus B of the second ball 30B rolling on the second outer ball groove 13 and a center locus b of the second ball 30B rolling on the second inner ball groove 23 is defined as a second open angle β, the second open angle β being on the side where a distance between the second outer ball groove 13 and the second inner ball groove 23 expands.

Here, a straight line SA illustrated in FIG. 1 is a line parallel to the tangent line of the center locus A of the center of the first ball 30A, and a straight line Sa illustrated in FIG. 1 is a line parallel to the tangent line of the center locus a of the center of the first ball 30A. In FIG. 1, in order to easily understand the figure, the angle formed between the straight line SA and the straight line Sa is illustrated as the first open angle α. Further, a straight line SB illustrated in FIG. 1 is a line parallel to the tangent line of the center locus B of the center of the second ball 30B, and a straight line Sb illustrated in FIG. 1 is a line parallel to the tangent line of the center locus b of the center of the second ball 30B. In FIG. 1, in order to easily understand the figure, the angle formed between the straight line SB and the straight line Sb is illustrated as the second open angle β.

In the constant velocity joint 100, when the center of the first ball 30A is placed at the same position as the joint center O in the central-axis-L1 direction of the outer joint member 10, the first open angle cc faces the opening side (the left side in FIG. 1) of the outer joint member 10. At this time, the first ball 30A receives a force to move the first ball 30A toward the opening side of the outer joint member 10. On the other hand, when the center of the second ball 30B is placed at the same position as the joint center O in the central-axis-L1 direction of the outer joint member 10, the second open angle β faces the bottom side (the right side in FIG. 1) of the outer joint member 10. At this time, the second ball 30B receives a force to move the second ball 30B toward the bottom side of the outer joint member 10.

Accordingly, at least when the centers of the first ball 30A and the second ball 30B are placed at the same position as the joint center O in the central-axis-L1 direction of the outer joint member 10, the force applied to the first ball 30A and the force applied to the second ball 30B cancel each other. Thus, in the constant velocity joint 100, it is possible to restrain frictions to be caused between the cage 40 and the inner peripheral surface 11 of the outer joint member 10 and between the cage 40 and the outer peripheral surface 21 of the inner joint member 20. As a result, in the constant velocity joint 100, it is possible to restrain a mechanical loss caused at the time when a torque is transmitted between the outer joint member 10 and the inner joint member 20.

Figure 2:
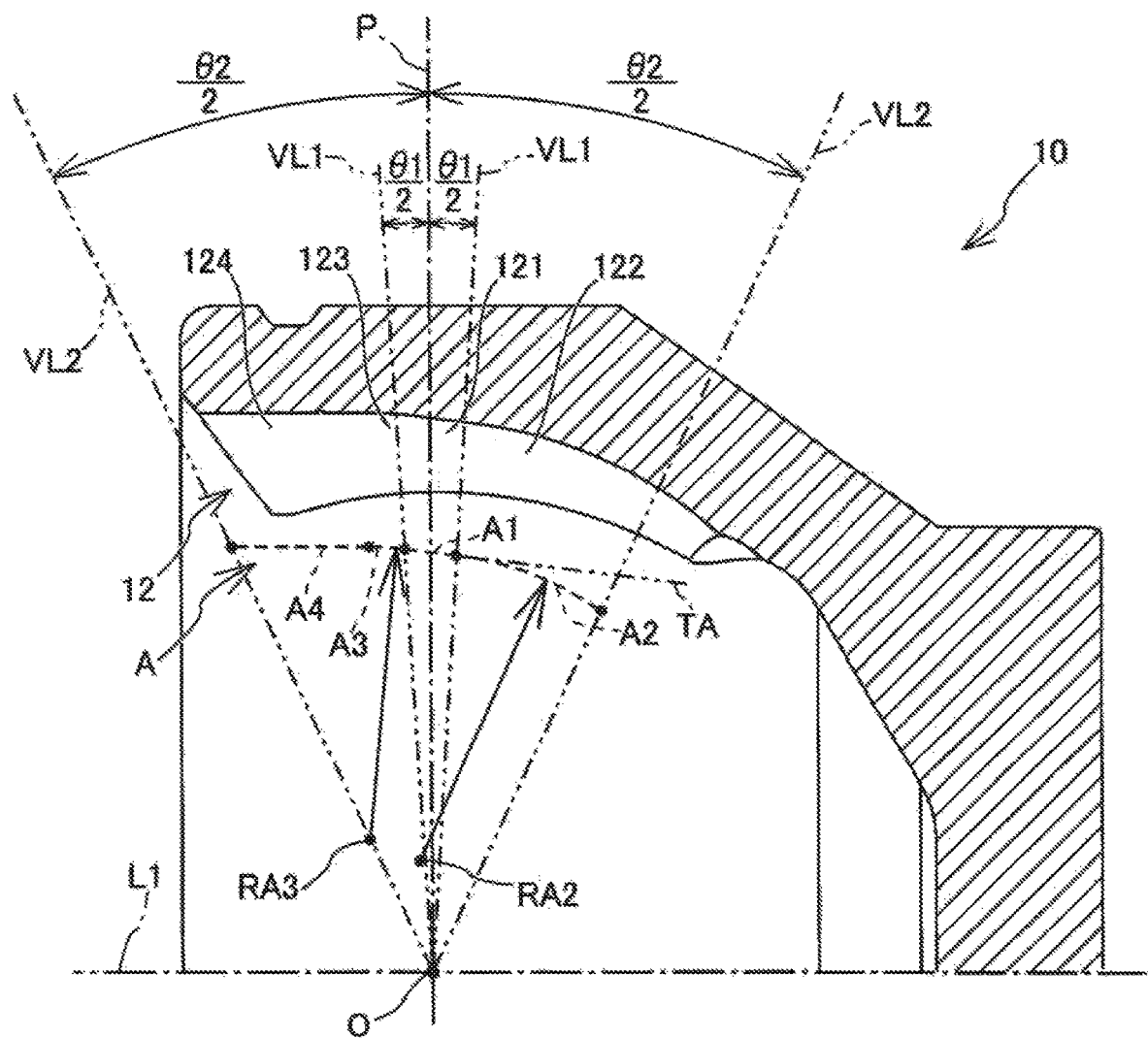
FIG. 2 is a view illustrating an axial section of an outer joint member including a first outer ball groove and is a view illustrating an upper part of the outer joint member illustrated in FIG. 1 in an enlarged manner.

Next will be described the first outer ball groove 12 with reference to FIG. 2. As illustrated in FIG. 2, the first outer ball groove 12 includes a first outer central portion 121, a first outer bottom side portion 122, a first outer connection opening side portion 123, and a first outer opening side portion 124.

The first outer central portion 121 is provided in a range including the joint center O in the central-axis-L1 direction of the outer joint member 10. The first outer bottom side portion 122 is provided closer to the bottom side (the right side in FIG. 2) of the outer joint member 10 than the first outer central portion 121 is. The first outer connection opening side portion 123 is provided in a part of the first outer ball groove 12, the part being closer to the opening side (the left side in FIG. 2) of the outer joint member 10 than the first outer central portion 121 is. The first outer opening side portion 124 is provided in a range from the first outer connection opening side portion 123 to the end of the opening of the outer joint member 10.

Figure 3:
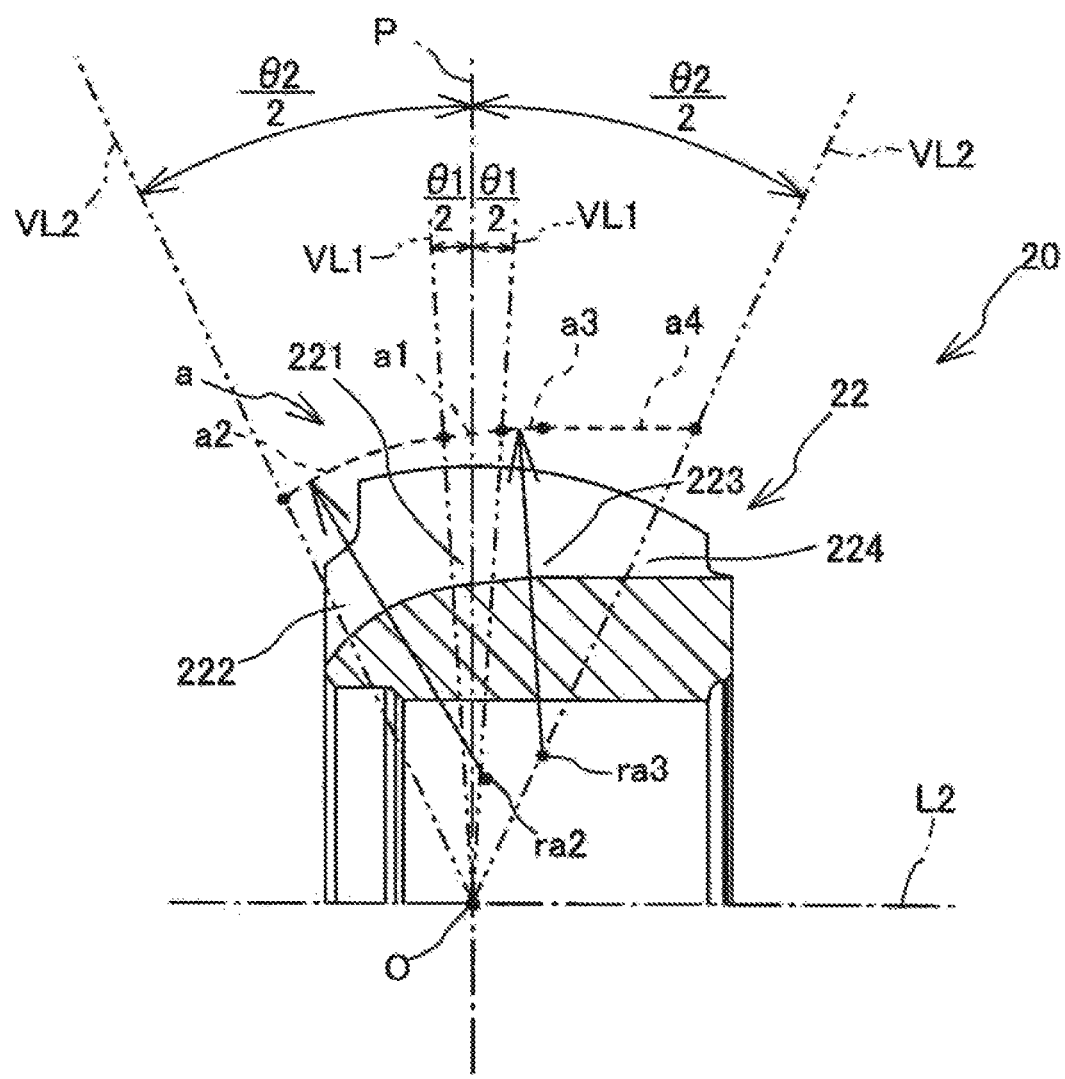
FIG. 3 is a view illustrating an axial section of an inner joint member including a first inner ball groove and is a view illustrating an upper part of the inner joint member illustrated in FIG. 1 in an enlarged manner.

Next will be described the first inner ball groove 22 with reference to FIG. 3. As illustrated in FIG. 3, the first inner ball groove 22 includes a first inner central portion 221, a first inner opening side portion 222, a first inner connection bottom side portion 223, and a first inner bottom side portion 224.

The first inner central portion 221 is a part corresponding to the first outer central portion 121 (see FIG. 2) and is provided in a range including the joint center O in the central-axis-L2 direction of the inner joint member 20. The first inner opening side portion 222 is a part corresponding to the first outer bottom side portion 122 (see FIG. 2) and is provided closer to a first side (the opening side of the outer joint member 10, the left side in FIG. 3) in the central-axis-L2 direction of the inner joint member 20 than the first inner central portion 221 is.

The first inner connection bottom side portion 223 is a part corresponding to the first outer connection opening side portion 123 (see FIG. 2) and is provided in a part of the first inner ball groove 22, the part being closer to a second side (the bottom side of the outer joint member 10, the right side in FIG. 3) in the central-axis-L2 direction of the inner joint member 20 than the first inner central portion 221 is. The first inner bottom side portion 224 is a part corresponding to the first outer opening side portion 124 (see FIG. 2) and is provided in a range from the first inner connection bottom side portion 223 to the end of the inner joint member 20 on the second side in the central-axis-L2 direction.

With reference to FIGS. 2 and 3, the following describes the shape of the center locus A of the first ball 30A. As illustrated in FIGS. 2 and 3, a center locus A1 of the first ball 30A rolling on the first outer central portion 121 is formed in a linear shape. The center locus A1 is inclined such that its distance from the central axis L1 of the outer joint member 10 becomes smaller toward the bottom side (the right side in FIG. 2) of the outer joint member 10.

Further, a center locus a1 of the first ball 30A rolling on the first inner central portion 221 is formed in a linear shape. The center locus a1 is inclined such that its distance from the central axis L2 of the inner joint member 20 increases toward the second side (the bottom side of the outer joint member 10, the right side in FIG. 3) in the central-axis-L2 direction of the inner joint member 20.

Here, the center locus A1 of the first ball 30A rolling on the first outer central portion 121 and the center locus a1 of the first ball 30A rolling on the first inner central portion 221 are formed in a linear shape. Hereby, at the time when the first ball 30A rolls between the first outer central portion 121 and the first inner central portion 221, the contact between the first inner ball groove 22 and the first ball 30A is contact between a planar shape and a projecting surface shape.

Accordingly, in the constant velocity joint 100, it is possible to increase the contact area between the first ball 30A and the first inner ball groove 22 at the time when the first ball 30A rolls between the first outer central portion 121 and the first inner central portion 221, in comparison with a case where the contact between the first inner central portion 221 and the first ball 30A is contact between projecting surface shapes. As a result, in the constant velocity joint 100, it is possible to reduce the contact pressure applied to the first inner central portion 221 from the first ball 30A. Accordingly, in the constant velocity joint 100, it is possible to improve durability of the inner joint member 20.

A center locus A2 of the first ball 30A rolling on the first outer bottom side portion 122 is formed in an arc shape having a predetermined arc center point RA2. The arc center point RA2 of the center locus A2 is disposed between the central axis L1 of the outer joint member 10 and the first outer ball groove 12 (above the central axis L1 of the outer joint member 10 in FIG. 2). Further, a center locus a2 of the first ball 30A rolling on the first inner opening side portion 222 is formed in an arc shape having a predetermined arc center point ra2, and the arc center point ra2 of the center locus a2 is disposed between the central axis L2 of the inner joint member 20 and the first inner ball groove 22 (above the central axis L2 of the inner joint member 20 in FIG. 3). Hereby, in the constant velocity joint 100, the arc radius of the center locus A2 of the first ball 30A rolling on the first outer bottom side portion 122 can be set to a small dimension, thereby making it possible to downsize the outer joint member 10.

Further, the center locus A2 of the first ball 30A rolling on the first outer bottom side portion 122 is disposed in the outer joint member 10 at a position radially inwardly from the tangent TA at a connecting position between the first outer central portion 121 and the first outer bottom side portion 122, the tangent extending in the first outer bottom side portion 122. Hereby, in the constant velocity joint 100, it is possible to downsize the outer joint member 10 and to sufficiently secure the thickness of the outer joint member 10 in the part where the first outer bottom side portion 122 is formed, thereby making it possible to improve durability of the outer joint member 10.

A center locus A3 of the first ball 30A rolling on the first outer connection opening side portion 123 is formed in an arc shape having a predetermined arc center point RA3. The arc center point RA3 of the center locus A3 is disposed between the central axis L1 of the outer joint member 10 and the first outer ball groove 12. Further, a center locus a3 of the first ball 30A rolling on the first inner connection bottom side portion 223 is formed in an arc shape having a predetermined arc center point ra3, and the arc center point ra3 of the center locus a3 is disposed between the central axis L2 of the inner joint member 20 and the first inner ball groove 22.

Here, a maximum joint angle used at the time when the vehicle (not shown) equipped with the constant velocity joint 100 travels straight is defined as a maximum commonly used angle θ1. That is, at the time when the vehicle travels straight, the joint angle that can be taken by the constant velocity joint 100 is equal to or less than the maximum commonly used angle θ1. Further, a virtual line that connects the center of the first ball 30A (the second ball 30B) at the time when the joint angle of the constant velocity joint 100 is the maximum commonly used angle θ1 to the joint center O is defined as a commonly-used-angle virtual line VL1. At this time, an inclination angle of the commonly-used-angle virtual line VL1 with respect to a plane P is θ1/2. The plane P is perpendicular to the central axis L1 of the outer joint member 10 and extends through the joint center O Note that it is preferable for the maximum commonly used angle θ1 to be set to 8 degrees or less. Hereby, it is possible to prevent the connecting position between a center locus B2 of the second ball 30B rolling on a second outer bottom side portion 132 and a center locus B1 of the second ball 30B rolling on a second outer central portion 131 from being largely distanced from the joint center O in the central-axis-L1 direction of the outer joint member 10. As a result, in the constant velocity joint 100, it is possible to downsize the outer joint member 10 in the central-axis-L1 direction.

The connecting position between the center locus A1 of the first ball 30A rolling on the first outer central portion 121 and the center locus A2 of the first ball 30A rolling on the first outer bottom side portion 122 is disposed at a position of the maximum commonly used angle θ1. That is, the connecting position between the center locus A1 of the first ball 30A rolling on the first outer central portion 121 and the center locus A2 of the first ball 30A rolling on the first outer bottom side portion 122 is provided on a commonly-used-angle virtual line VL1 inclined toward the bottom side of the outer joint member 10 in FIG. 2.

Similarly, the connecting position between the center locus A1 of the first ball 30A rolling on the first outer central portion 121 and the center locus A3 of the first ball 30A rolling on the first outer connection opening side portion 123 is disposed at a position of the maximum commonly used angle θ1. That is, the connecting position between the center locus A1 of the first ball 30A rolling on the first outer central portion 121 and the center locus A3 of the first ball 30A rolling on the first outer connection opening side portion 123 is provided on a commonly-used-angle virtual line VL1 inclined toward the opening side of the outer joint member 10 in FIG. 2.

In this case, an angle at which the first outer central portion 121 is formed corresponds to the maximum commonly used angle θ1, and the center locus A1 of the first ball 30A rolling on the first outer central portion 121 is provided between the commonly-used-angle virtual line VL1 inclined toward the bottom side of the outer joint member 10 and the commonly-used-angle virtual line VL1 inclined toward the opening side of the outer joint member 10 in FIG. 2.

Further, the connecting position between the center locus a1 of the first ball 30A rolling on the first inner central portion 221 and the center locus a2 of the first ball 30A rolling on the first inner opening side portion 222 is disposed at a position of the maximum commonly used angle θ1. That is, the connecting position between the center locus a1 of the first ball 30A rolling on the first inner central portion 221 and the center locus a2 of the first ball 30A rolling on the first inner opening side portion 222 is provided on a commonly-used-angle virtual line VL1 inclined toward the first side in the central-axis-L2 direction of the inner joint member 20 in FIG. 3.

Similarly, the connecting position between the center locus a1 of the first ball 30A rolling on the first inner central portion 221 and the center locus a3 of the first ball 30A rolling on the first inner connection bottom side portion 223 is disposed at a position of the maximum commonly used angle θ1. That is, the connecting position between the center locus a1 of the first ball 30A rolling on the first inner central portion 221 and the center locus a3 of the first ball 30A rolling on the first inner connection bottom side portion 223 is provided on a commonly-used-angle virtual line VL1 inclined toward the second side in the central-axis-L2 direction of the inner joint member 20 in FIG. 3.

In this case, an angle at which the first inner central portion 221 is formed corresponds to the maximum commonly used angle θ1, and the center locus a1 of the first ball 30A rolling on the first inner central portion 221 is provided between the commonly-used-angle virtual line VL1 inclined toward the first side in the central-axis-L2 direction of the inner joint member 20 and the commonly-used-angle virtual line VL1 inclined toward the second side in the central-axis-L2 direction of the inner joint member 20 in FIG. 3.

Note that an inclination angle of the commonly-used-angle virtual line VL1 inclined toward the bottom side of the outer joint member 10 from the plane P is the same angle (θ1/2) as an inclination angle of the commonly-used-angle virtual line VL1 inclined toward the opening side of the outer joint member 10 from the plane P. That is, in the constant velocity joint 100, a joint angle at the connecting position between the center locus A1 of the first ball 30A rolling on the first outer central portion 121 and the center locus A2 of the first ball 30A rolling on the first outer bottom side portion 122 is the same angle (the maximum commonly used angle θ1) as a joint angle at the connecting position between the center locus A1 of the first ball 30A rolling on the first outer central portion 121 and the center locus A3 of the first ball 30A rolling on the first outer connection opening side portion 123.

Further, a joint angle of the constant velocity joint 100 at the time when its movement is restricted by a stopper structure (e.g., interference between a shaft (not shown) connected to the inner joint member 20 and the end of the opening of the outer joint member 10, and the like) of the constant velocity joint 100 is defined as a maximum movable angle θ2. In this case, the joint angle that can be taken by the constant velocity joint 100 is equal to or less than the maximum movable angle θ2. Further, a virtual line that connects the center of the first ball 30A (the second ball 30B) at the time when the joint angle of the constant velocity joint 100 is the maximum movable angle θ2 to the joint center O is defined as a movable-angle virtual line VL2. At this time, an inclination angle of the movable-angle virtual line VL2 from the plane P is θ2/2.

The arc center point RA3 of the center locus A3 of the first ball 30A rolling on the first outer connection opening side portion 123 is disposed on a movable-angle virtual line VL2 inclined toward the opening side of the outer joint member 10 in FIG. 2. Further, the arc center point ra3 of the center locus a3 of the first ball 30A rolling on the first inner connection bottom side portion 223 is disposed on a movable-angle virtual line VL2 inclined toward the second side in the central-axis-L2 direction of the inner joint member 20 in FIG. 3.

In the first outer ball groove 12, the first outer central portion 121 and the first outer opening side portion 124 are connected to each other via the first outer connection opening side portion 123. Further, in the first inner ball groove 22, the first inner central portion 221 and the first inner bottom side portion 224 are connected to each other via the first inner connection bottom side portion 223. Hereby, in the constant velocity joint 100, the first ball 30A can be rolled smoothly in comparison with a case where the first outer central portion 121 is directly connected to the first outer opening side portion 124, or a case where the first inner central portion 221 is directly connected to the first inner bottom side portion 224.

Further, a center locus A4 of the first ball 30A rolling on the first outer opening side portion 124 has a linear shape and extends in parallel to the central axis L1 of the outer joint member 10. Further, a center locus a4 of the first ball 30A rolling on the first inner bottom side portion 224 has a linear shape and extends in parallel to the central axis L2 of the inner joint member 20. In this case, in the constant velocity joint 100, it is possible to set the maximum movable angle θ2 to a larger angle and to sufficiently secure the thickness of the outer joint member 10 in the part where the first outer opening side portion 124 is formed. Accordingly, in the constant velocity joint 100, it is possible to improve the durability of the outer joint member 10.

Note that, no matter where the center of the first ball 30A moves in the central-axis-L1 direction of the outer joint member 10 within a whole range from a position of the maximum movable angle θ2 on the opening side of the outer joint member 10 to a position of the maximum movable angle θ2 on the bottom side of the outer joint member 10 (in a whole range between the movable-angle virtual line VL2 inclined toward the opening side of the outer joint member 10 and the movable-angle virtual line VL2 inclined toward the bottom side of the outer joint member 10), the first open angle α faces the opening side of the outer joint member 10.

Hereby, in the constant velocity joint 100, it is possible to apply, to the first ball 30A, a force to move the center of the first ball 30A toward the opening side of the outer joint member 10 within a whole range from the position of the maximum movable angle θ2 on the opening side of the outer joint member 10 to a position of a maximum movable angle θ2 on the bottom side of the outer joint member 10 in the central-axis-L1 direction of the outer joint member 10. As a result, in a case where the constant velocity joint 100 is provided in the vehicle, even if the joint angle has any angle, the force to move the first ball 30A toward the opening side of the outer joint member 10 can be applied to the first ball 30A.

Figure 4:
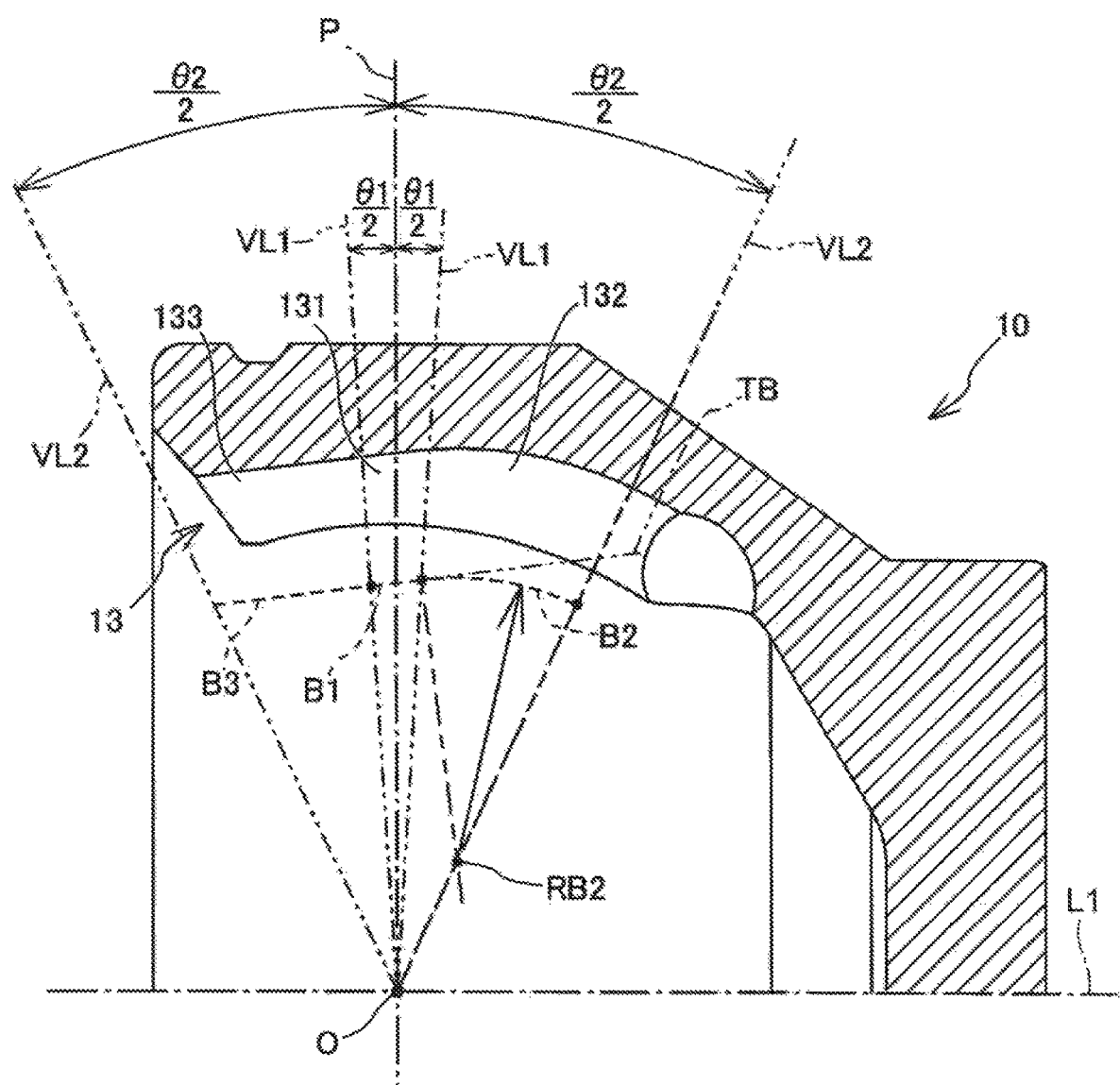
FIG. 4 is a view illustrating an axial section of the outer joint member including a second outer ball groove and is a view illustrating a lower part of the outer joint member illustrated in FIG. 1 in an enlarged manner in an upside-down state.

Next the second outer ball groove 13 will be described with reference to FIG. 4. As illustrated in FIG. 4, the second outer ball groove 13 includes the second outer central portion 131, the second outer bottom side portion 132, and a second outer opening side portion 133.

The second outer central portion 131 is provided in a range including the joint center O in the central-axis-L1 direction of the outer joint member 10. The second outer bottom side portion 132 is provided closer to the bottom side (the right side in FIG. 4) of the outer joint member 10 than the second outer central portion 131. The second outer opening side portion 133 is provided in a range from the second outer central portion 131 to the end of the opening of the outer joint member 10.

Figure 5:
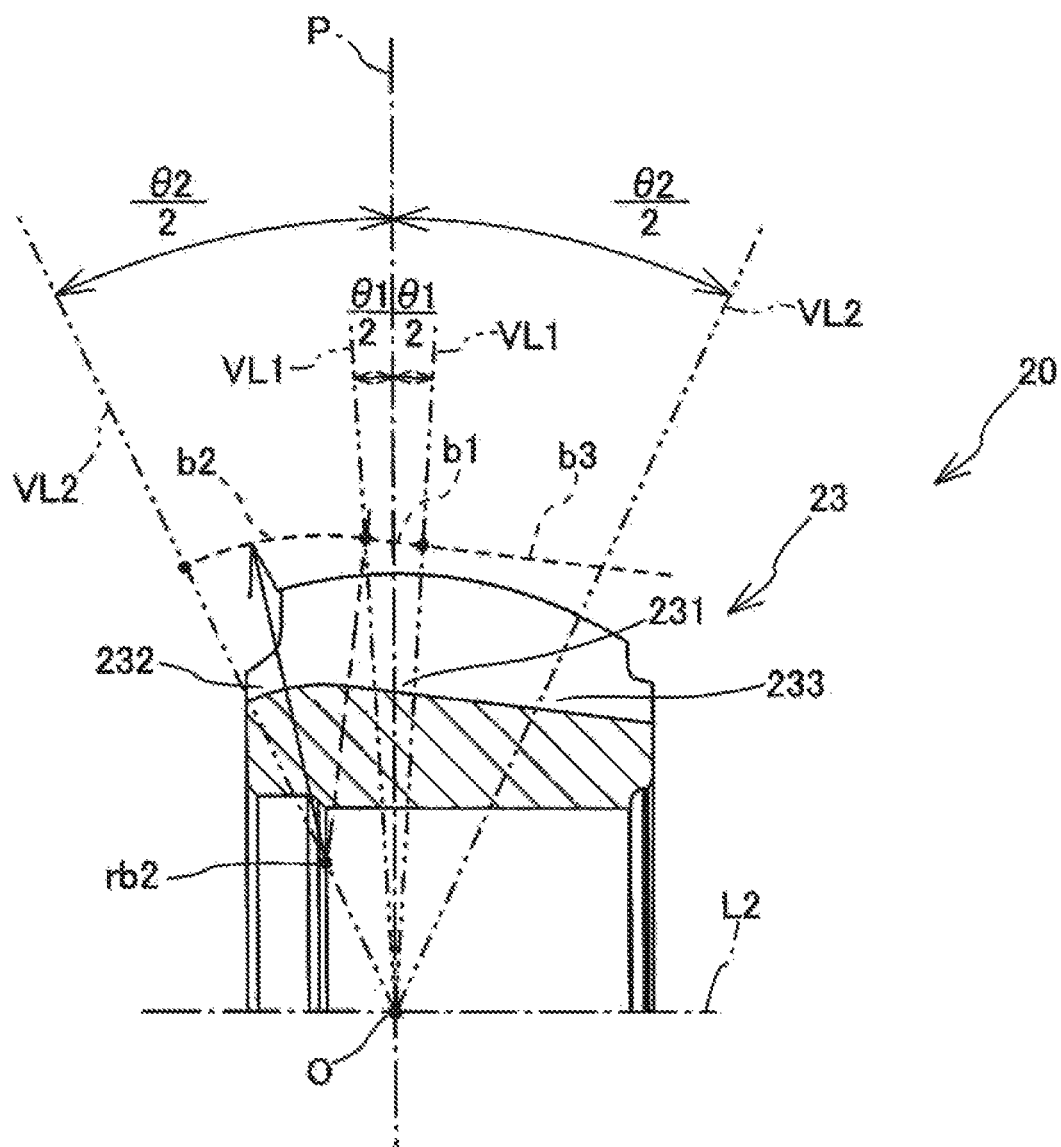
FIG. 5 is a view illustrating an axial section of the inner joint member including a second inner ball groove and is a view illustrating a lower part of the inner joint member illustrated in FIG. 1 in an enlarged manner in an upside-down state.

Next the second inner ball groove 23 will be described with reference to FIG. 5. As illustrated in FIG. 5, the second inner ball groove 23 includes a second inner central portion 231, a second inner opening side portion 232, and a second inner bottom side portion 233.

The second inner central portion 231 is a part corresponding to the second outer central portion 131 (see FIG. 4) and is provided in a range including the joint center O in the central-axis-L2 direction of the inner joint member 20. The second inner opening side portion 232 is a part corresponding to the second outer bottom side portion 132 (see FIG. 4) and is provided closer to the first side (the opening side of the outer joint member 10, the left side in FIG. 5) in the central-axis-L2 direction of the inner joint member 20 than the second inner central portion 231 is. The second inner bottom side portion 233 is a part corresponding to the second outer opening side portion 133 (see FIG. 4) and is provided in a range from the second inner central portion 231 to the end of the inner joint member 20 on the second side (the bottom side of the outer joint member 10, the right side in FIG. 5) in the central-axis-L2 direction of the inner joint member 20.

With reference to FIGS. 4 and 5, the following describes the shape of the center locus B of the second ball 30B. As illustrated in FIGS. 4 and 5, the center locus B1 of the second ball 30B rolling on the second outer central portion 131 is formed in a linear shape. The center locus B1 is inclined such that its distance from the central axis L1 of the outer joint member 10 increases toward the bottom side (the right side in FIG. 4) of the outer joint member 10.

Further, a center locus b1 of the second ball 30B rolling on the second inner central portion 231 is formed in a linear shape. The center locus b1 is inclined such that its distance from the central axis L2 of the inner joint member 20 becomes smaller toward the second side in the central-axis-L2 direction of the inner joint member 20.

Here, the center locus B1 of the second ball 30B rolling on the second outer central portion 131 and the center locus b1 of the second ball 30B rolling on the second inner central portion 231 are formed in a linear shape. In this case, at the time when the second ball 30B rolls between the second outer central portion 131 and the second inner central portion 231, the contact between the second inner ball groove 23 and the second ball 30B is contact between a planar shape and a projecting surface shape.

Accordingly, in the constant velocity joint 100, it is possible to increase the contact area between the second ball 30B and the second inner ball groove 23 at the time when the second ball 30B rolls between the second outer central portion 131 and the second inner central portion 231, in comparison with a case where the contact between the second inner ball groove 23 and the second ball 30B is contact between projecting surface shapes. As a result, in the constant velocity joint 100, it is possible to reduce the contact pressure applied to the second inner central portion 231 from the second ball 30B. Accordingly, in the constant velocity joint 100, it is possible to improve the durability of the inner joint member 20.

The center locus B2 of the second ball 30B rolling on the second outer bottom side portion 132 is formed in an arc shape having a predetermined arc center point RB2. The arc center point RB2 of the center locus B2 is disposed between the central axis L1 of the outer joint member 10 and the second outer ball groove 13 (above the central axis L1 of the outer joint member 10 in FIG. 4). Further, a center locus b2 of the second ball 30B rolling on the second inner opening side portion 232 is formed in an arc shape having a predetermined arc center point rb2. The arc center point rb2 of the center locus b2 is disposed between the central axis L2 of the inner joint member 20 and the second inner ball groove 23 (above the central axis L2 of the inner joint member 20 in FIG. 5). Accordingly, in the constant velocity joint 100, it is possible to downsize the outer joint member 10.

Further, the center locus B2 of the second ball 30B rolling on the second outer bottom side portion 132 is disposed in the outer joint member 10 at a position radially inwardly from the tangent TB at a connecting position between the second outer central portion 131 and the second outer bottom side portion 132, the tangent extending in the second outer bottom side portion 132. Hereby, in the constant velocity joint 100, it is possible to downsize the outer joint member 10 and to sufficiently secure the thickness of the outer joint member 10 in the part where the second outer bottom side portion 132 is formed, thereby making it possible to improve the durability of the outer joint member 10.

A center locus B3 of the second ball 30B rolling on the second outer opening side portion 133 is formed in a linear shape. Accordingly, the outer joint member 10 can have the second outer ball groove 13 formed in a simple shape in comparison with a case where the center locus B3 of the second ball 30B rolling on the second outer opening side portion 133 is formed in a curved shape. In addition to this, the center locus B3 is disposed on the extension line of the center locus B1 of the second ball 30B rolling on the second outer central portion 131. In this case, the outer joint member 10 can have the second outer ball groove 13 formed in a simple shape in comparison with a case where the second outer opening side portion 133 is formed in an S-shape in which the curvature of the center locus B3 of the second ball 30B rolling on the second outer opening side portion 133 is reversed in the middle.

Similarly, a center locus b3 of the second ball 30B rolling on the second inner bottom side portion 233 is formed in a linear shape. Accordingly, the inner joint member 20 can have the second inner ball groove 23 formed in a simple shape in comparison with a case where the center locus b3 of the second ball 30B rolling on the second inner bottom side portion 233 is formed in a curved shape. In addition to this, the center locus b3 is disposed on the extension line of the center locus b 1 of the second ball 30B rolling on the second inner central portion 231. Hereby, the inner joint member 20 can have the second inner ball groove 23 formed in a simple shape. Accordingly, in the constant velocity joint 100, it is possible to easily form the second outer ball groove 13 and the second inner ball groove 23.

Here, in the present embodiment, the connecting position between the center locus B1 of the second ball 30B rolling on the second outer central portion 131 and the center locus B2 of the second ball 30B rolling on the second outer bottom side portion 132 is disposed at a position of the maximum commonly used angle $\theta 1$. That is, the connecting position between the center locus B1 of the second ball 30B rolling on the second outer central portion 131 and the center locus B2 of the second ball 30B rolling on the second outer bottom side portion 132 is provided on a commonly-used-angle virtual line VL1 inclined toward the bottom side of the outer joint member 10 in FIG. 4. Similarly, the connecting position between the center locus B1 of the second ball 30B rolling on the second outer central portion 131 and the center locus B3 of the second ball 30B rolling on the second outer opening side portion 133 is disposed at a position of the maximum commonly used angle $\theta 1$. That is, the connecting position between the center locus B1 of the second ball 30B rolling on the second outer central portion 131 and the center locus B3 of the second ball 30B rolling on the second outer opening side portion 133 is provided on a commonly-used-angle virtual line VL1 inclined toward the opening side of the outer joint member 10 in FIG. 4.

In this case, an angle at which the second outer central portion 131 is formed corresponds to the maximum commonly used angle $\theta 1$, and the center locus B1 of the second ball 30B rolling on the second outer central portion 131 is formed between the commonly-used-angle virtual line VL1 inclined toward the bottom side of the outer joint member 10 and the commonly-used-angle virtual line VL1 inclined toward the opening side of the outer joint member 10 in FIG. 4. Hereby, in the constant velocity joint 100, at the time when the vehicle travels straight, the center of the second ball 30B can be placed between the second outer central portion 131 and the second inner central portion 231.

Note that an inclination angle of the commonly-used-angle virtual line VL1 inclined toward the bottom side of the outer joint member 10 from the plane P is the same angle ($\theta 1/2$) as an inclination angle of the commonly-used-angle virtual line VL1 inclined toward the opening side of the outer joint member 10 from the plane P. That is, in the constant velocity joint 100, a joint angle at the connecting position between the center locus B1 of the second ball 30B rolling on the second outer central portion 131 and the center locus B2 of the second ball 30B rolling on the second outer bottom side portion 132 is the same angle (the maximum commonly used angle $\theta 1$) as a joint angle at the connecting position between the center locus B1 of the second ball 30B rolling on the second outer central portion 131 and the center locus B3 of the second ball 30B rolling on the second outer opening side portion 133.

Further, the arc center point RB2 of the center locus B2 of the second ball 30B rolling on the second outer bottom side portion 132 is disposed at an intersection between a movable-angle virtual line VL2 inclined toward the bottom side of the outer joint member 10 in FIG. 4 and a line perpendicular to the center locus B1 at the connecting position between the center locus B1 of the second ball 30B rolling on the second outer central portion 131 and the center locus B2 of the second ball 30B rolling on the second outer bottom side portion 132. Further, the arc center point rb2 of the center locus b2 of the second ball 30B rolling on the first inner opening side portion 222 is disposed at an intersection between a movable-angle virtual line VL2 inclined toward the first side in the central-axis-L2 direction of the inner joint member 20 in FIG. 5 and a line perpendicular to the center locus b 1 at the connecting position between the center locus b 1 of the second ball 30B rolling on the second inner central portion 231 and the center locus b2 of the second ball 30B rolling on the second inner opening side portion.

Figure 6:
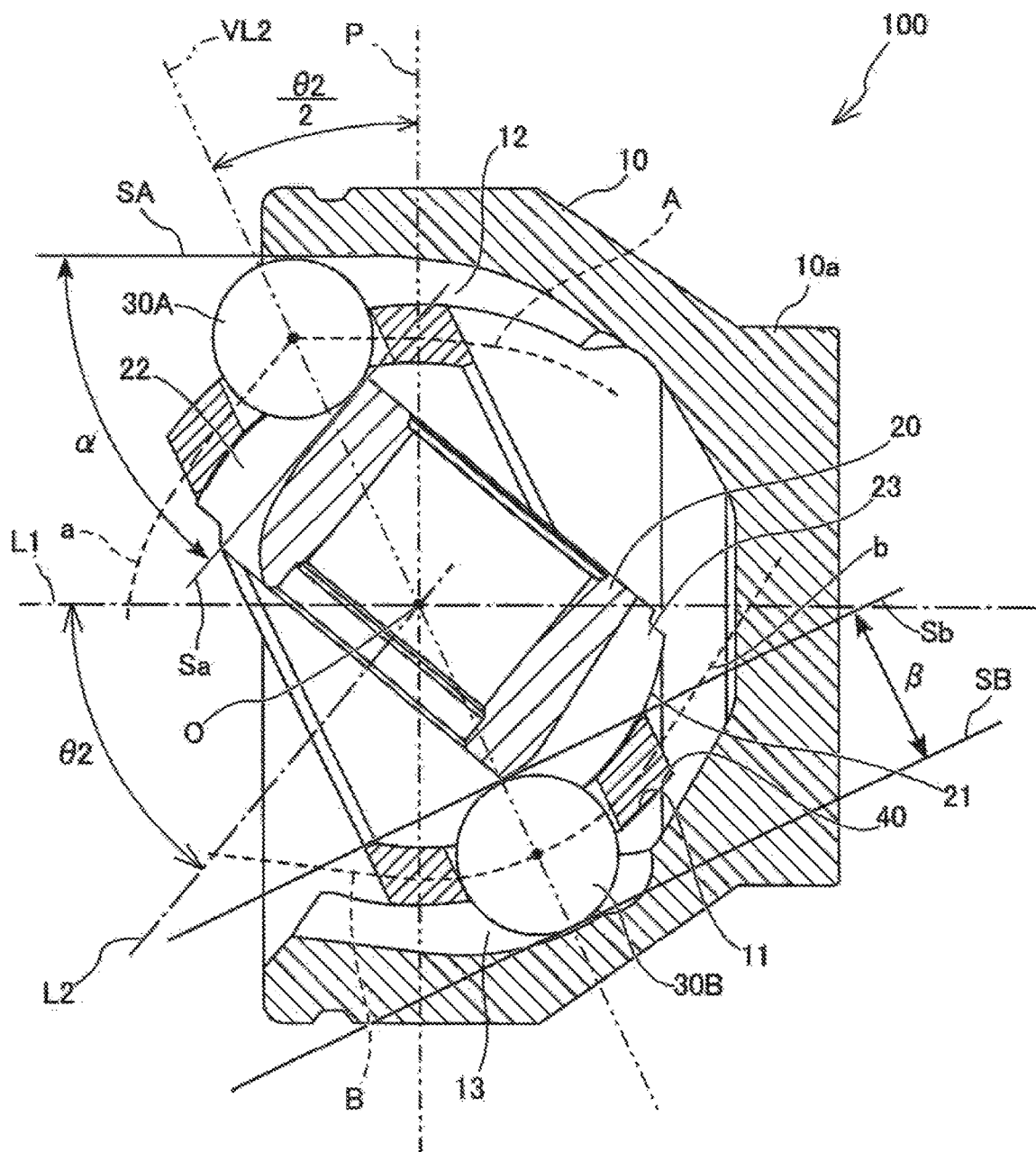
FIG. 6 is a view illustrating an axial section of the constant velocity joint at the time when the joint angle is a maximum movable angle.

In this case, in the constant velocity joint 100, when the joint angle is the maximum movable angle $\theta 2$, the second open angle $\beta$ is zero degrees (the straight line SB is parallel to the straight line Sb, see FIG. 6). That is, while the center of the second ball 30B is moving from the joint center O to a position of the maximum movable angle $\theta 2$ on the bottom side of the outer joint member 10 in the central-axis-L1 direction of the outer joint member 10 (in the state illustrated in FIG. 5, when the center of the second ball 30B moves between the plane P and the movable-angle virtual line VL2), the second open angle $\beta$ is not reversed from a state where the second open angle $\beta$ faces the bottom side of the outer joint member 10 to a state where the second open angle $\beta$ faces the opening side thereof.

Accordingly, in the constant velocity joint 100, it is possible to prevent a force to move the second ball 30B toward the opening side of the outer joint member 10 from being applied to the second ball 30B while the center of the second ball 30B is moving from the joint center O to the position of the maximum movable angle $\theta 2$ on the bottom side of the outer joint member 10 in the central-axis-L 1 direction of the outer joint member 10.

Here, with reference to FIGS. 2 to 5, the following describes a relationship between the center locus A of the first ball 30A and the center locus B of the second ball 30B. As illustrated in FIGS. 2 to 5, the center locus A1 of the first ball 30A rolling on the first outer central portion 121 is formed in a shape obtained by reversing, with respect to the plane P, the center locus B1 of the second ball 30B rolling on the second outer central portion 131. Further, the center locus a1 of the first ball 30A rolling on the first inner central portion 221 is formed in a shape obtained by reversing, with respect to the plane P, the center locus b1 of the second ball 30B rolling on the second inner central portion 231.

Hereby, in the constant velocity joint 100, in a state where the first ball 30A is placed between the first outer central portion 121 and the first inner central portion 221 and in a state where the second ball 30B is placed between the second outer central portion 131 and the second inner central portion 231, the force applied to the first ball 30A and the force applied to the second ball 30B can effectively cancel each other. As a result, in the constant velocity joint 100, it is possible to restrain frictions to be caused between the cage 40 and the inner peripheral surface 11 of the outer joint member 10 and between the cage 40 and the outer peripheral surface 21 of the inner joint member 20.

Note that, in the constant velocity joint 100, the second open angle $\beta$ has a large angle when the center of the second ball 30B is disposed near the joint center O in the central-axis-L1 direction of the outer joint member 10. That is, in the constant velocity joint 100, a force to move the second ball 30B toward the bottom side of the outer joint member 10 is large in a state where the second ball 30B rolls between the second outer central portion 131 and the second inner central portion 231.

In this regard, in the constant velocity joint 100, a joint angle at the connecting position between the first outer central portion 121 and the first outer bottom side portion 122 and a joint angle at the connecting position between the second outer central portion 131 and the second outer bottom side portion 132 are the same angle (the maximum commonly used angle $\theta 1$). Respective angles at which the first outer central portion 121, the first inner central portion 221, the second outer central portion 131, and the second inner central portion 231 are formed correspond to the maximum commonly used angle $\theta 1$. That is, the first outer central portion 121, the first inner central portion 221, the second outer central portion 131, and the second inner central portion 231 are formed in regions within the commonly used angle.

In this case, the first ball 30A is disposed between the first outer central portion 121 and the first inner central portion 221 at the time when the vehicle travels straight, so that the frequency at the first ball 30A rolls between the first outer central portion 121 and the first inner central portion 221 is extremely high. Similarly, the second ball 30B is disposed between the second outer central portion 131 and the second inner central portion 231 at the time of straight advance of the vehicle, so that the frequency at which the second ball 30B rolls between the second outer central portion 131 and the second inner central portion 231 is extremely high.

That is, in a state where the constant velocity joint 100 is provided in the vehicle, the frequency at which the first ball 30A rolls between the first outer central portion 121 and the first inner central portion 221 is made high and the frequency at which the second ball 30B rolls between the second outer central portion 131 and the second inner central portion 231 is made high, so that the force applied to the first ball 30A and the force applied to the second ball 30B can effectively cancel each other. As a result, in the constant velocity joint 100, it is possible to effectively restrain frictions to be caused between the cage 40 and the inner peripheral surface 11 of the outer joint member 10 and between the cage 40 and the outer peripheral surface 21 of the inner joint member 20.

Further, in the constant velocity joint 100, the center locus A1 of the first ball 30A rolling on the first outer central portion 121 and the center locus a1 of the first ball 30A rolling on the first inner central portion 221 are formed in a linear shape. Hereby, in the constant velocity joint 100, it is possible to reduce the contact pressure applied to the first inner central portion 221 from the first ball 30A at the time when the first ball 30A rolls between the first outer central portion 121 and the first inner central portion 221. Similarly, in the constant velocity joint 100, the center locus B1 of the second ball 30B rolling on the second outer central portion 131 and the center locus b1 of the second ball 30B rolling on the second inner central portion 231 are formed in a linear shape. Hereby, in the constant velocity joint 100, it is possible to reduce the contact pressure applied to the second inner central portion 231 from the second ball 30B at the time when the second ball 30B rolls between the second outer central portion 131 and the second inner central portion 231.

Further, when the frequency at which the first ball 30A rolls between the first outer central portion 121 and the first inner central portion 221 is made high in a state where the constant velocity joint 100 is provided in the vehicle, it is possible to maintain, for a long time, a state where the contact pressure applied to the first inner central portion 221 from the first ball 30A is reduced. Similarly, when the frequency at which the second ball 30B rolls between the second outer central portion 131 and the second inner central portion 231 is made high in a state where the constant velocity joint 100 is provided in the vehicle, it is possible to maintain, for a long time, a state where the contact pressure applied to the second inner central portion 231 from the second ball 30B is reduced.

As such, in the constant velocity joint 100, the first ball 30A is placed between the first outer central portion 121 and the first inner central portion 221 and the second ball 30B is placed between the second outer central portion 131 and the second inner central portion 231 at the time when the vehicle travels straight. Hereby, in the constant velocity joint 100, it is possible to effectively restrain frictions to be caused between the cage 40 and the inner peripheral surface 11 of the outer joint member 10 and between the cage 40 and the outer peripheral surface 21 of the inner joint member 20, and it is also possible to effectively improve the durability of the inner joint member 20.

Further, the center locus A3 of the first ball 30A rolling on the first outer connection opening side portion 123 is formed in a shape obtained by reversing, with respect to the plane P, the center locus B2 of the second ball 30B rolling on the second outer bottom side portion 132. Similarly, the center locus a3 of the first ball 30A rolling on the first inner connection bottom side portion 223 is formed in a shape obtained by reversing, with respect to the plane P, the center locus b2 of the second ball 30B rolling on the second inner opening side portion 232.

Hereby, in the constant velocity joint 100, in a state where the first ball 30A is placed between the first outer connection opening side portion 123 and the first inner connection bottom side portion 223 and in a state where the second ball 30B is placed between the second outer bottom side portion 132 and the second inner opening side portion 232, the force applied to the first ball 30A and the force applied to the second ball 30B can effectively cancel each other. Accordingly, in the constant velocity joint 100, it is possible to restrain frictions to be caused between the cage 40 and the inner peripheral surface 11 of the outer joint member 10 and between the cage 40 and the outer peripheral surface 21 of the inner joint member 20.

Further, the center locus B3 of the second ball 30B rolling on the second outer opening side portion 133 and the center locus b3 of the second ball 30B rolling on the second inner bottom side portion 233 are formed in a linear shape. As a result, in the constant velocity joint 100, it is possible to reduce the contact pressure applied to the second inner bottom side portion 233 from the second ball 30B. Similarly, the center locus A4 of the first ball 30A rolling on the first outer opening side portion 124 and the center locus a4 of the first ball 30A rolling on the first inner bottom side portion 224 are formed in a linear shape. As a result, in the constant velocity joint 100, it is possible to reduce the contact pressure applied to the first inner bottom side portion 224 from the first ball 30A. Hereby, in the constant velocity joint 100, it is possible to improve the durability.

With reference to FIG. 6, an operation mode of the constant velocity joint 100 is described. FIG. 6 illustrates the constant velocity joint 100 at the time when the center of the second ball 30B is disposed closer to the bottom side of the outer joint member 10 than the joint center O is and the joint angle is the maximum movable angle $\theta 2$.

As illustrated in FIG. 6, in the constant velocity joint 100, when the joint angle is the maximum movable angle $\theta 2$, the second open angle $\beta$ is zero degrees (the straight line SB is parallel to the straight line Sb). That is, while the center of the second ball 30B is moving from the joint center O to the position of the maximum movable angle $\theta 2$ on the bottom side of the outer joint member 10 in the central-axis-L1 direction of the outer joint member 10 (when the center of the second ball 30B moves between the plane P and the movable-angle virtual line VL2 in FIG. 6), the second open angle $\beta$ is not reversed from the state where the second open angle $\beta$ faces the bottom side of the outer joint member 10 to the state where the second open angle faces the opening side thereof.

In the meantime, while the center of the first ball 30A is moving from the joint center O to the position of the maximum movable angle $\theta 2$ on the opening side of the outer joint member 10 in the central-axis-L1 direction of the outer joint member 10 (when the center of the first ball 30A moves between the plane P and the movable-angle virtual line VL2 in FIG. 6), the first open angle $\alpha$ is maintained in a state where the first open angle $\alpha$ faces the opening side of the outer joint member 10.

Accordingly, in the constant velocity joint 100, while the center of the second ball 30B is moving from the joint center O to the position of the maximum movable angle $\theta 2$ on the bottom side of the outer joint member 10 in the central-axis-L1 direction of the outer joint member 10, the force applied to the first ball 30A and the force applied to the second ball 30B cancel each other. Thus, in the constant velocity joint 100, even in a state where the joint angle is the maximum movable angle $\theta 2$, it is possible to restrain frictions to be caused between the cage 40 and the inner peripheral surface 11 of the outer joint member 10 and between the cage 40 and the outer peripheral surface 21 of the inner joint member 20.

Thus, in the constant velocity joint 100, even in a state where the joint angle is large, it is possible to restrain frictions to be caused between the cage 40 and the inner peripheral surface 11 of the outer joint member 10 and between the cage 40 and the outer peripheral surface 21 of the inner joint member 20. As a result, in the constant velocity joint 100, it is possible to restrain a mechanical loss caused at the time of transmitting a torque between the outer joint member 10 and the inner joint member 20.

Here, a constant velocity joint used for a front drive shaft configured to be provided in a vehicle requires a large joint angle at the time of use, in comparison with a constant velocity joint used for a rear drive shaft. In terms of this, in the constant velocity joint 100, even in a state where the joint angle is large, it is possible to restrain frictions to be caused between the cage 40 and the inner peripheral surface 11 of the outer joint member 10 and between the cage 40 and the outer peripheral surface 21 of the inner joint member 20. As a result, in the constant velocity joint 100, it is possible to enhance a function of the front drive shaft.

2. Second Embodiment

Next the second embodiment will be described with reference to FIGS. 7 to 12. The first embodiment deals with a case where the center locus B1 of the second ball 30B rolling on the second outer central portion 131 and the center locus b1 of the second ball 30B rolling on the second inner central portion 231 are formed in a linear shape. However, in the second embodiment, a center locus B11 of the second ball 30B rolling on a second outer central portion 431 and a center locus b11 of the second ball 30B rolling on a second inner central portion 531 are formed in an arc shape. Note that the same component as in the first embodiment has the same reference sign, and a description thereof is omitted.

Figure 7:
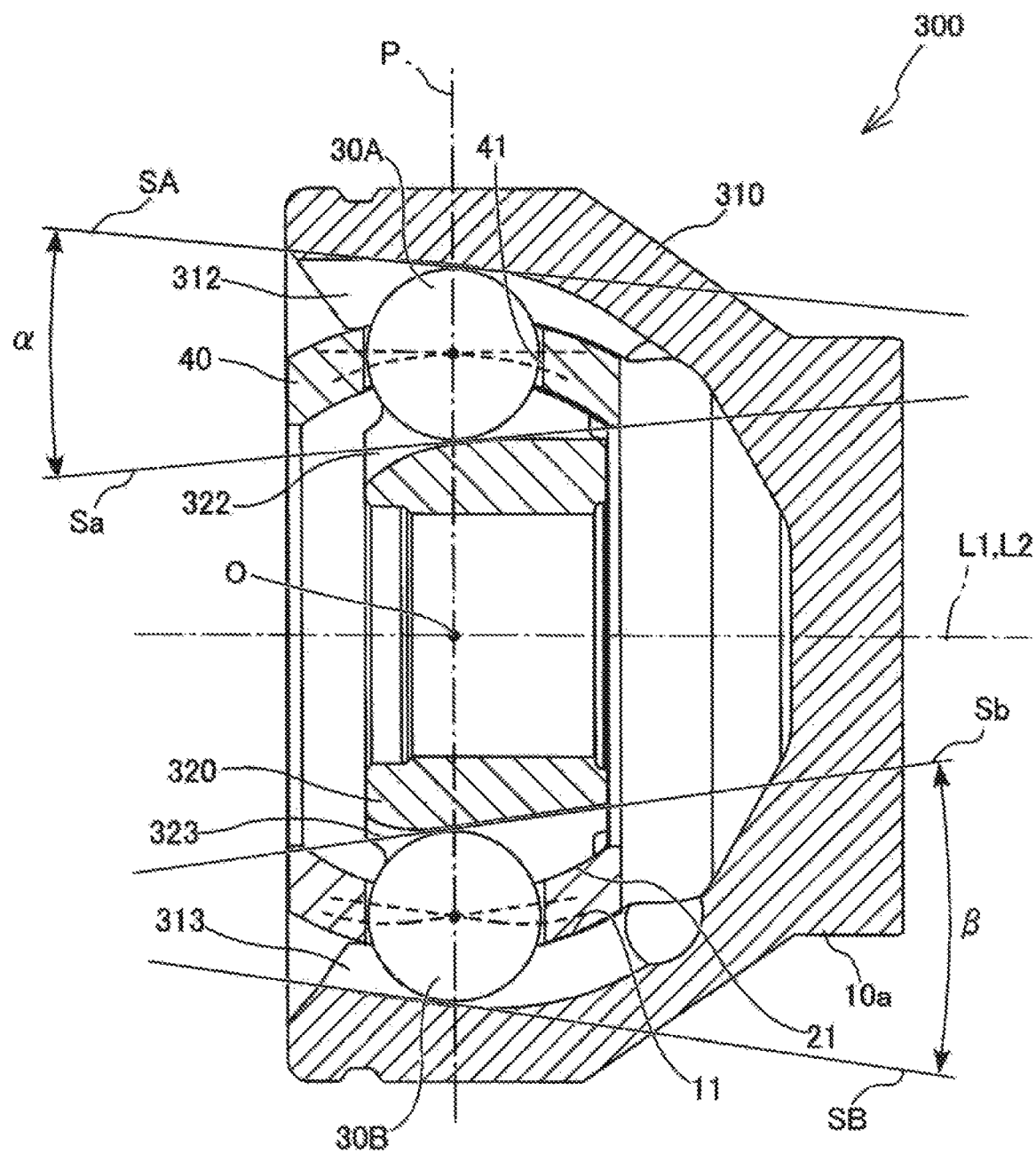
FIG. 7 is a view illustrating an axial section of a constant velocity joint in a second embodiment.

Next a schematic configuration of a constant velocity joint 300 will be described. As illustrated in FIG. 7, the constant velocity joint 300 mainly includes an outer joint member 310, an inner joint member 320, the first balls 30A, the second balls 30B, and the cage 40.

The outer joint member 310 includes the inner peripheral surface 11, and first outer ball grooves 312 and second outer ball grooves 313 formed on the inner peripheral surface 11. The outer joint member 310 is configured such that three first outer ball grooves 312 and three second outer ball grooves 313 are formed alternately in the circumferential direction.

The inner joint member 320 includes the outer peripheral surface 21, and first inner ball grooves 322 and second inner ball grooves 323 formed on the outer peripheral surface 21. The inner joint member 320 is configured such that three first inner ball grooves 322 and three second inner ball grooves 323 are formed alternately in the circumferential direction. The first inner ball groove 322 corresponds to the first outer ball groove 312, and the second inner ball groove 323 corresponds to the second outer ball groove 313.

In the constant velocity joint 300, when the center of the first ball 30A is placed at the same position as the joint center O in the central-axis-L1 direction of the outer joint member 310, the first open angle α faces the opening side (the left side in FIG. 7) of the outer joint member 310. On the other hand, when the center of the second ball 30B is placed at the same position as the joint center O in the central-axis-L1 direction of the outer joint member 310, the second open angle β faces the bottom side (the right side in FIG. 7) of the outer joint member 310.

Accordingly, at least when the centers of the first ball 30A and the second ball 30B are placed at the same position as the joint center O in the central-axis-L1 direction of the outer joint member 310, a force applied to the first ball 30A and a force applied to the second ball 30B cancel each other. Accordingly, in the constant velocity joint 300, it is possible to restrain frictions to be caused between the cage 40 and the inner peripheral surface 11 of the outer joint member 310 and between the cage 40 and the outer peripheral surface 21 of the inner joint member 320. As a result, in the constant velocity joint 300, it is possible to restrain a mechanical loss caused at the time of transmitting a torque between the outer joint member 310 and the inner joint member 320.

Figure 8:
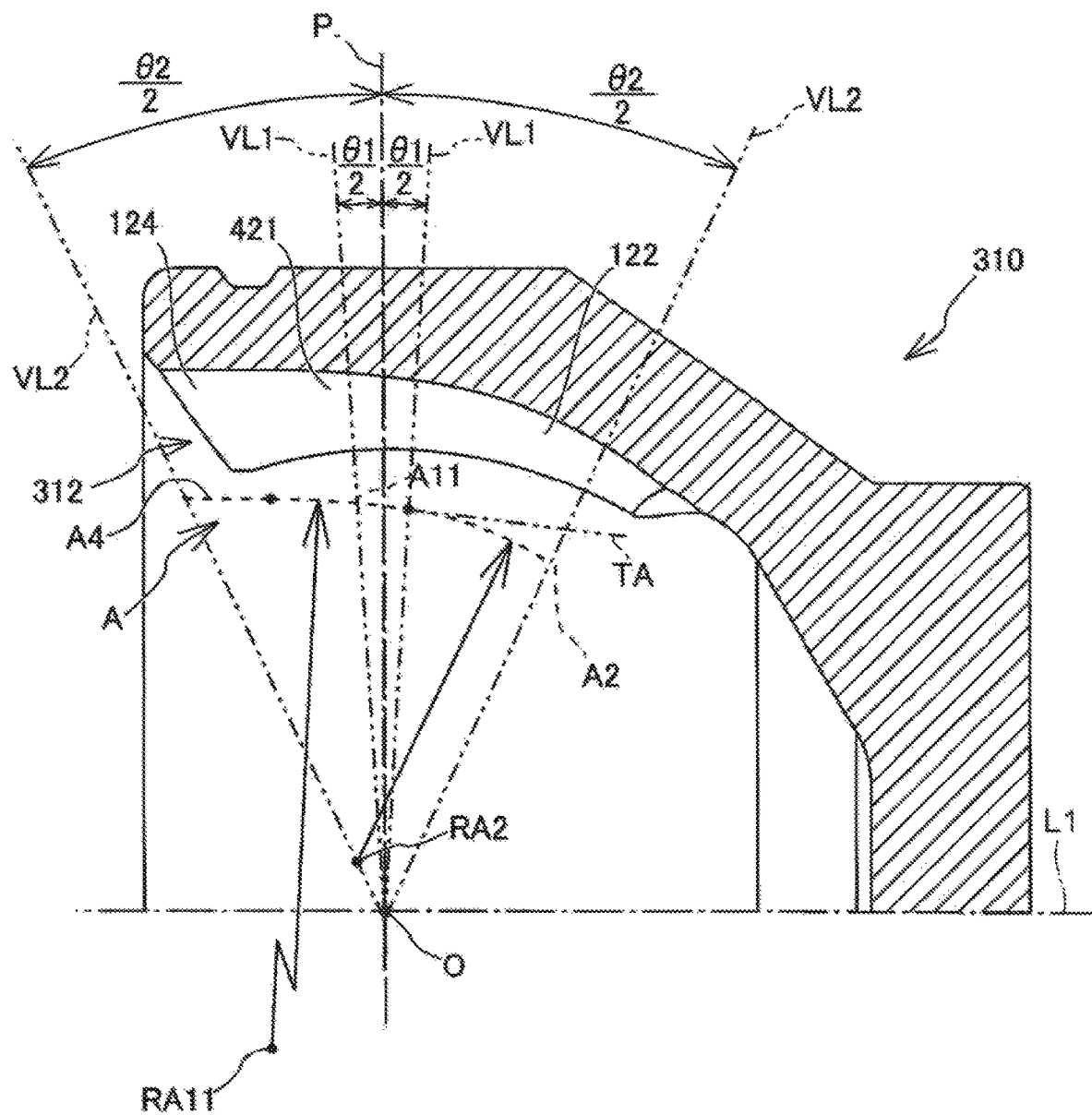
FIG. 8 is a view illustrating an axial section of an outer joint member including a first outer ball groove and is a view illustrating an upper part of the outer joint member illustrated in FIG. 7 in an enlarged manner.

Next the first outer ball groove 312 will be described with reference to FIG. 8. As illustrated in FIG. 8, the first outer ball groove 312 includes a first outer central portion 421, the first outer bottom side portion 122, and the first outer opening side portion 124. The first outer central portion 421 is provided in a range including the joint center O in the central-axis-L1 direction of the outer joint member 310.

Figure 9:
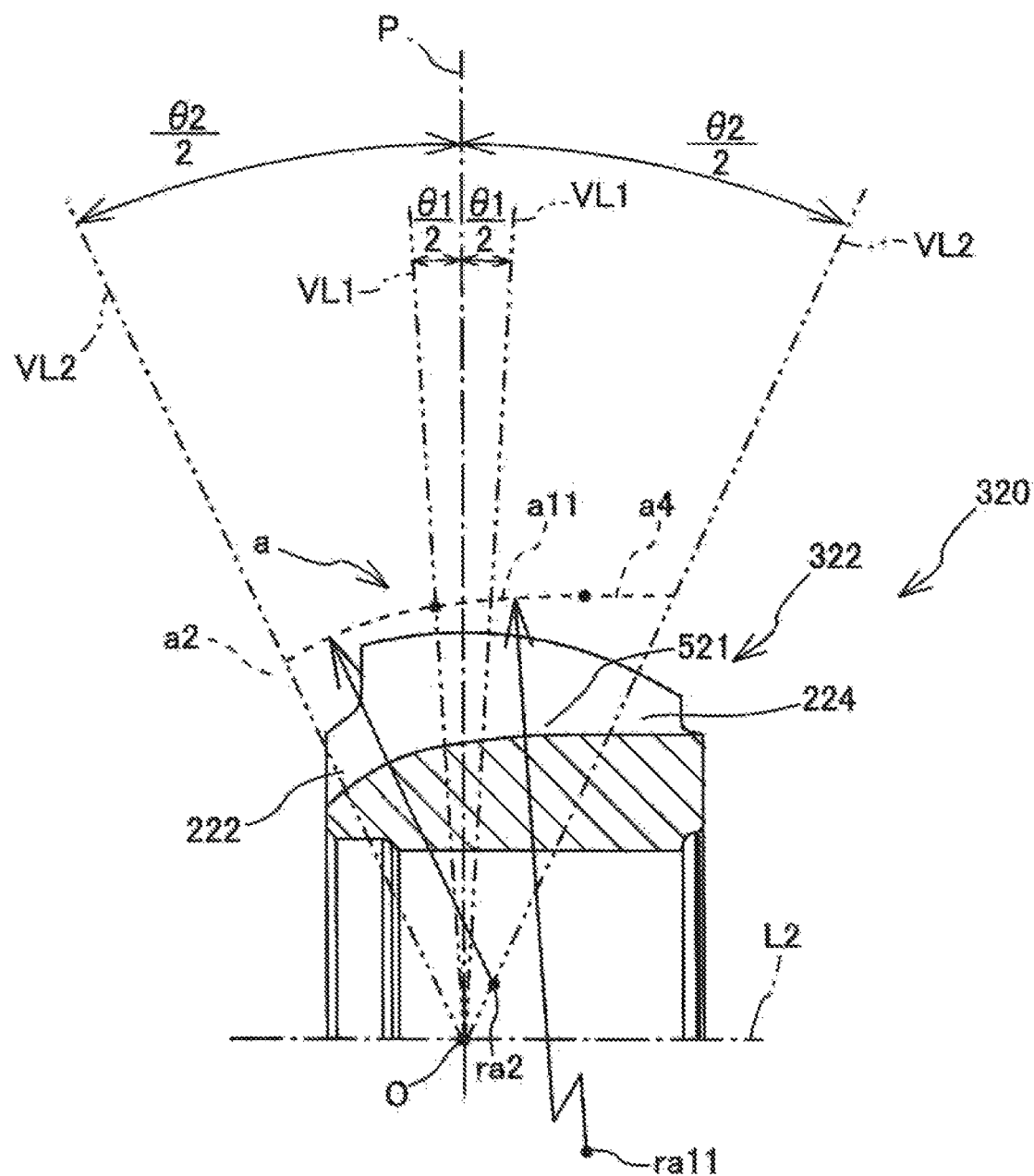
FIG. 9 is a view illustrating an axial section of an inner joint member including a first inner ball groove and is a view illustrating an upper part of the inner joint member illustrated in FIG. 7 in an enlarged manner.

Next the first inner ball groove 322 will be described with reference to FIG. 9. As illustrated in FIG. 9, the first inner ball groove 322 includes a first inner central portion 521, the first inner opening side portion 222, and the first inner bottom side portion 224. The first inner central portion 521 is provided in a range including the joint center O in the central-axis-L2 direction of the inner joint member 320.

With reference to FIGS. 8 and 9, the following describes the shape of the center locus A of the first ball 30A. As illustrated in FIGS. 8 and 9, a center locus A11 of the first ball 30A rolling on the first outer central portion 421 is formed in an arc shape having a predetermined arc center point RA11. Further, the center locus A11 is inclined such that its distance from the central axis L1 of the outer joint member 310 becomes smaller toward the bottom side (the right side in FIG. 8) of the outer joint member 310. The arc center point RA11 of the center locus A11 is disposed on the opposite side of the central axis L1 of the outer joint member 310 from the first outer ball groove 312 (i.e., the arc center point RA11 is disposed below the central axis L1 of the outer joint member 310 in FIG. 8), and the arc center point RA11 of the center locus A11 is disposed closer to the opening side (the left side in FIG. 8) of the outer joint member 310 than the joint center O is.

Further, a center locus a11 of the first ball 30A rolling on the first inner central portion 521 is formed in an arc shape having a predetermined arc center point ra11. Further, the center locus a11 is inclined such that its distance from the central axis L2 of the inner joint member 320 increases toward the second side (the bottom side of the outer joint member 310, the right side in FIG. 9) in the central-axis-L2 direction of the inner joint member 320. The arc center point ra11 of the center locus a11 is disposed on the opposite side of the central axis L2 of the inner joint member 320 from the first inner ball groove 322 (i.e., the arc center point ra11 is disposed below the central axis L2 of the inner joint member 320 in FIG. 9), and the arc center point ra11 of the center locus a11 is disposed closer to the second side (the bottom side of the outer joint member 310, the right side in FIG. 9) in the central-axis-L2 direction of the inner joint member 320 than the joint center O is.

In the meantime, the arc center point RA2 of the center locus A2 of the first ball 30A rolling on the first outer bottom side portion 122 is disposed between the central axis L1 of the outer joint member 310 and the first outer ball groove 312 (above the central axis L1 of the outer joint member 310 in FIG. 8). That is, the arc radius of the center locus A11 of the first ball 30A rolling on the first outer central portion 421 is set to be larger than the arc radius of the center locus A2 of the first ball 30A rolling on the first outer bottom side portion 122.

Further, the arc center point ra2 of the center locus a2 of the first ball 30A rolling on the first inner opening side portion 222 is disposed between the central axis L2 of the inner joint member 320 and the first inner ball groove 322 (above the central axis L2 of the inner joint member 320 in FIG. 9). Hereby, the arc radius of the center locus a11 of the first ball 30A rolling on the first inner central portion 521 is set to be larger than the arc radius of the center locus a2 of the first ball 30A rolling on the first inner opening side portion 222.

In this case, in the constant velocity joint 300, when the arc radius of the center locus A2 of the first ball 30A rolling on the first outer bottom side portion 122 and the arc radius of the center locus a2 of the first ball 30A rolling on the first inner opening side portion 222 are set to be small, it is possible to downsize the outer joint member 310. In the meantime, in the constant velocity joint 300, when the arc radius of the center locus A11 of the first ball 30A rolling on the first outer central portion 421 and the arc radius of the center locus all of the first ball 30A rolling on the first inner central portion 521 are set to be large, the connecting position between the center locus A11 of the first ball 30A rolling on the first outer central portion 421 and the center locus A4 of the first ball 30A rolling on the first outer opening side portion 124 can be formed to be more distant from the central axis L1 of the outer joint member 310 in the radial direction. Hereby, in the constant velocity joint 300, it is possible to downsize the outer joint member 310 and to set the maximum movable angle θ2 to a larger angle.

The connecting position between the center locus A11 of the first ball 30A rolling on the first outer central portion 421 and the center locus A2 of the first ball 30A rolling on the first outer bottom side portion 122 is disposed at a position of the maximum commonly used angle θ1. That is, the connecting position between the center locus A11 of the first ball 30A rolling on the first outer central portion 421 and the center locus A2 of the first ball 30A rolling on the first outer bottom side portion 122 is provided on a commonly-used-angle virtual line VL1 inclined toward the bottom side of the outer joint member 310 in FIG. 8.

Further, the connecting position between the center locus all of the first ball 30A rolling on the first inner central portion 521 and the center locus a2 of the first ball 30A rolling on the first inner opening side portion 222 is placed at a position of the maximum commonly used angle θ1. That is, the connecting position between the center locus all of the first ball 30A rolling on the first inner central portion 521 and the center locus a2 of the first ball 30A rolling on the first inner opening side portion 222 is provided on a commonly-used-angle virtual line VL1 inclined toward the opening side of the inner joint member 320 in FIG. 9.

Note that the connecting position between the center locus A11 of the first ball 30A rolling on the first outer central portion 421 and the center locus A4 of the first ball 30A rolling on the first outer opening side portion 124 is provided closer to the opening side of the outer joint member 310 than the commonly-used-angle virtual line VL1 is. Similarly, the connecting position between the center locus all of the first ball 30A rolling on the first inner central portion 521 and the center locus a4 of the first ball 30A rolling on the first inner bottom side portion 224 is provided closer to the second side (the bottom side of the outer joint member 310, the right side in FIG. 9) in the central-axis-L2 direction of the inner joint member 320 than the commonly-used-angle virtual line VL1 is.

Figure 10:
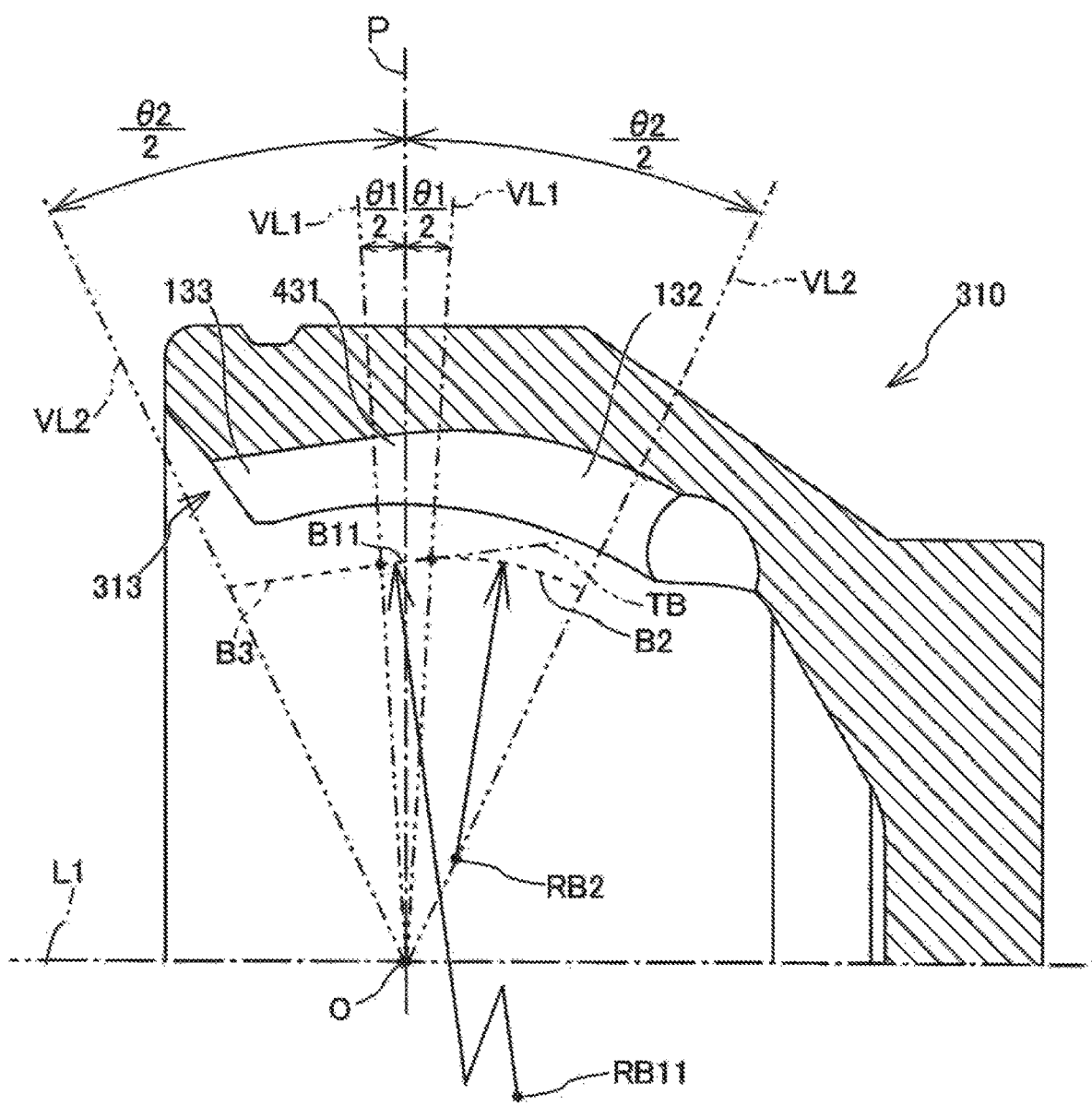
FIG. 10 is a view illustrating an axial section of the outer joint member including a second outer ball groove and is a view illustrating a lower part of the outer joint member illustrated in FIG. 7 in an enlarged manner in an upside-down state.

Next the second outer ball groove 313 will be described with reference to FIG. 10. As illustrated in FIG. 10, the second outer ball groove 313 includes the second outer central portion 431, the second outer bottom side portion 132, and the second outer opening side portion 133. The second outer central portion 431 is provided in a range including the joint center O in the central-axis-L1 direction of the outer joint member 310.

Figure 11:
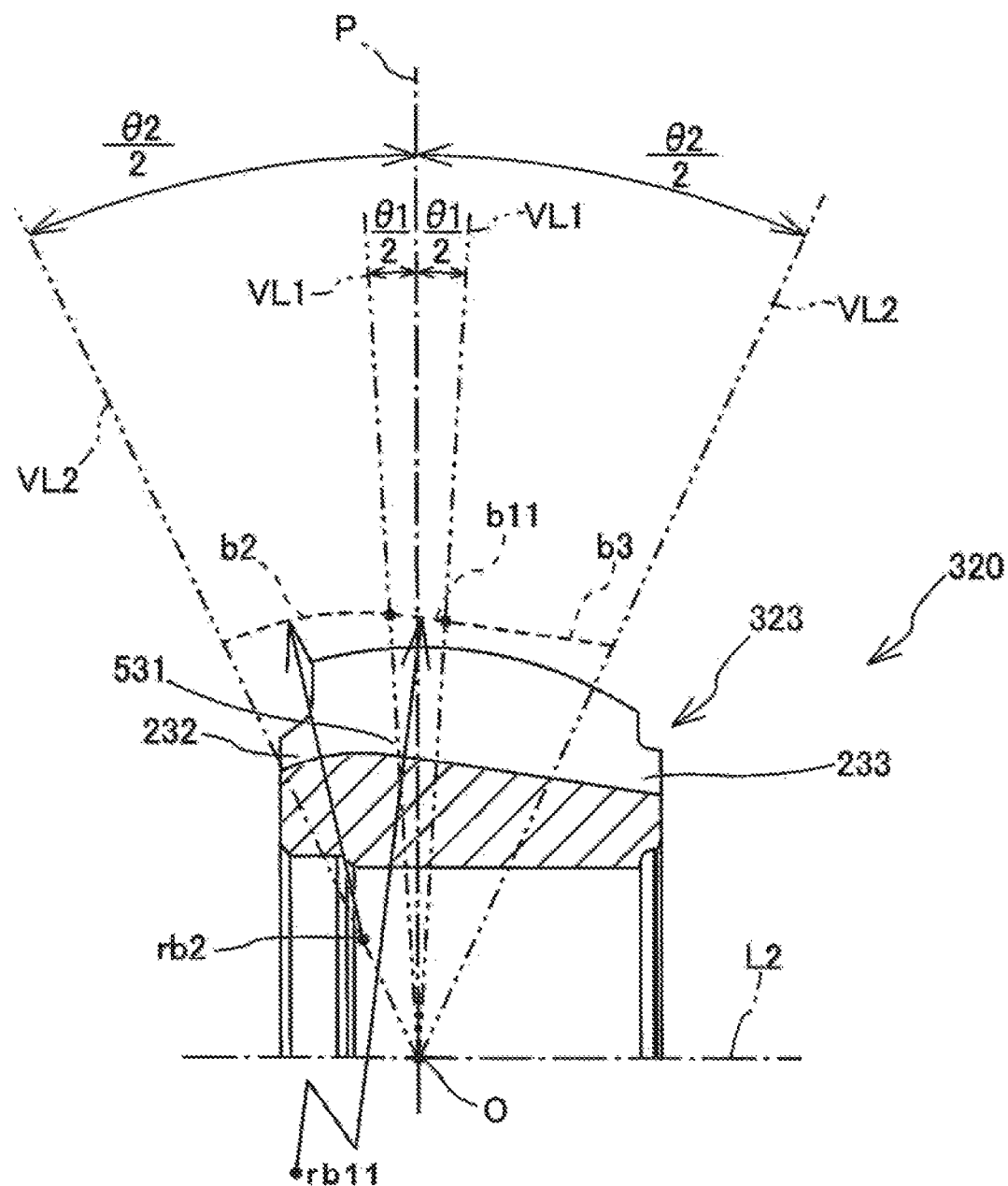
FIG. 11 is a view illustrating an axial section of the inner joint member including a second inner ball groove and is a view illustrating a lower part of the inner joint member illustrated in FIG. 7 in an enlarged manner in an upside-down state.

Next the second inner ball groove 323 will be described with reference to FIG. 11. As illustrated in FIG. 11, the second inner ball groove 323 includes the second inner central portion 531, the second inner opening side portion 232, and the second inner bottom side portion 233. The second inner central portion 531 is provided in a range including the joint center O in the central-axis-L2 direction of the inner joint member 320.

With reference to FIGS. 10 and 11, the following describes the shape of the center locus B of the second ball 30B. As illustrated in FIGS. 10 and 11, the center locus B11 of the second ball 30B rolling on the second outer central portion 431 is formed in an arc shape having a predetermined arc center point RB11. Further, the center locus B11 is inclined such that its distance from the central axis L1 of the outer joint member 310 increases toward the bottom side of the outer joint member 310. The arc center point RB11 of the center locus B11 is disposed on the opposite side of the central axis L1 of the outer joint member 310 from the second outer ball groove 313 (i.e., the arc center point RB11 is disposed below the central axis L1 of the outer joint member 310 in FIG. 10), and the arc center point RB11 of the center locus B11 is disposed closer to the bottom side (the right side in FIG. 10) of the outer joint member 310 than the joint center O is.

Further, the center locus b11 of the second ball 30B rolling on the second inner central portion 531 is formed in an arc shape having a predetermined arc center point rb11. Further, the center locus b 11 is inclined such that its distance from the central axis L2 of the inner joint member 320 becomes smaller toward the second side (the bottom side of the outer joint member 310, the right side in FIG. 11) in the central-axis-L2 direction of the inner joint member 320. The arc center point rb11 of the center locus b11 is disposed on the opposite side of the central axis L2 of the inner joint member 320 from the second inner ball groove 323 (i.e., the arc center point rb11 is disposed below the central axis L2 of the inner joint member 320 in FIG. 11), and the arc center point rb11 of the center locus b 11 is disposed closer to the opening side (the left side in FIG. 11) of the inner joint member 320 than the joint center O is.

In the meantime, the arc center point RB2 of the center locus B2 of the second ball 30B rolling on the second outer bottom side portion 132 is disposed between the central axis L1 of the outer joint member 310 and the second outer ball groove 313 (above the central axis L1 of the outer joint member 310 in FIG. 10), and the arc center point RB2 of the center locus B2 of the second ball 30B rolling on the second outer bottom side portion 132 is disposed closer to the bottom side of the outer joint member 310 than the joint center O is. That is, the arc radius of the center locus B11 of the second ball 30B rolling on the second outer central portion 431 is set to be larger than the arc radius of the center locus B2 of the second ball 30B rolling on the second outer bottom side portion 132.

Further, the arc center point rb2 of the center locus b2 of the second ball 30B rolling on the second inner opening side portion 232 is disposed between the central axis L2 of the inner joint member 320 and the second inner ball groove 323 (above the central axis L2 of the inner joint member 320 in FIG. 11). That is, the arc radius of the center locus b11 of the second ball 30B rolling on the second inner central portion 531 is set to be larger than the arc radius of the center locus b2 of the second ball 30B rolling on the second inner opening side portion 232.

In this case, in the constant velocity joint 300, when the arc radius of the center locus B2 of the second ball 30B rolling on the second outer bottom side portion 132 and the arc radius of the center locus b2 of the second ball 30B rolling on the second inner opening side portion 232 are set to be small, it is possible to downsize the outer joint member 310. In the meantime, in the constant velocity joint 300, when the arc radius of the center locus B11 of the second ball 30B rolling on the second outer central portion 431 and the arc radius of the center locus b 11 of the second ball 30B rolling on the second inner central portion 531 are set to be large, the connecting position between the center locus B11 of the second ball 30B rolling on the second outer central portion 431 and the center locus B3 of the second ball 30B rolling on the second outer opening side portion 133 in the outer joint member 310 can be formed to be more distant from the central axis L1 of the outer joint member 310 in the radial direction. Hereby, in the constant velocity joint 300, it is possible to downsize the outer joint member 310 and to set the maximum movable angle θ2 to a larger angle.

Further, the connecting position between the center locus B11 of the second ball 30B rolling on the second outer central portion 431 and the center locus B2 of the second ball 30B rolling on the second outer bottom side portion 132 is disposed at a position of the maximum commonly used angle θ1. That is, the connecting position between the center locus B11 of the second ball 30B rolling on the second outer central portion 431 and the center locus B2 of the second ball 30B rolling on the second outer bottom side portion 132 is provided on a commonly-used-angle virtual line VL1 inclined toward the bottom side of the outer joint member 310 in FIG. 10. Further, the connecting position between the center locus B11 of the second ball 30B rolling on the second outer central portion 431 and the center locus B3 of the second ball 30B rolling on the second outer opening side portion 133 is disposed at a position of the maximum commonly used angle θ1. That is, the connecting position between the center locus B11 of the second ball 30B rolling on the second outer central portion 431 and the center locus B3 of the second ball 30B rolling on the second outer opening side portion 133 is provided on a commonly-used-angle virtual line VL1 inclined toward the opening side of the outer joint member 310 in FIG. 10.

Similarly, the connecting position between the center locus b11 of the second ball 30B rolling on the second inner central portion 531 and the center locus b2 of the second ball 30B rolling on the second inner opening side portion 232 is placed at a position of the maximum commonly used angle θ1. That is, the connecting position between the center locus b11 of the second ball 30B rolling on the second inner central portion 531 and the center locus b2 of the second ball 30B rolling on the second inner opening side portion 232 is provided on a commonly-used-angle virtual line VL1 inclined toward the first side (the opening side of the outer joint member 310, the left side in FIG. 11) in the central-axis-L2 direction of the inner joint member 320 in FIG. 11.

Further, the connecting position between the center locus b 11 of the second ball 30B rolling on the second inner central portion 531 and the center locus b3 of the second ball 30B rolling on the second inner bottom side portion 233 is placed at a position of the maximum commonly used angle θ1. That is, the connecting position between the center locus b11 of the second ball 30B rolling on the second inner central portion 531 and the center locus b3 of the second ball 30B rolling on the second inner bottom side portion 233 is provided on a commonly-used-angle virtual line VL1 inclined toward the second side (the bottom side of the outer joint member 310, the right side in FIG. 11) in the central-axis-L2 direction of the inner joint member 320 in FIG. 11.

With reference to FIGS. 8 to 11, the following describes a relationship between the center locus A of the first ball 30A and the center locus B of the second ball 30B.

As illustrated in FIGS. 8 to 11, the center locus A11 of the first ball 30A rolling on the first outer central portion 421 is formed in a shape obtained by reversing, with respect to the plane P, the center locus B11 of the second ball 30B rolling on the second outer central portion 431. Similarly, the center locus a11 of the first ball 30A rolling on the first inner central portion 521 is formed in a shape obtained by reversing, with respect to the plane P, the center locus b11 of the second ball 30B rolling on the second inner central portion 531.

Hereby, in the constant velocity joint 300, in a state where the first ball 30A is placed between the first outer central portion 421 and the first inner central portion 521 and in a state where the second ball 30B is placed between the second outer central portion 431 and the second inner central portion 531, the force applied to the first ball 30A and the force applied to the second ball 30B can effectively cancel each other. Accordingly, in the constant velocity joint 300, it is possible to restrain frictions to be caused between the cage 40 and the inner peripheral surface 11 of the outer joint member 310 and between the cage 40 and the outer peripheral surface 21 of the inner joint member 320.

Further, in the constant velocity joint 300, the second ball 30B rolls between the second outer central portion 431 and the second inner central portion 531 at the time when vehicle travels straight, so that the frequency at which the second ball 30B rolls between the second outer central portion 431 and the second inner central portion 531 can be made high. Accordingly, at the time when the constant velocity joint 300 is provided in the vehicle, the force applied to the first ball 30A can be effectively canceled by the force applied to the second ball 30B. As a result, in the constant velocity joint 300, it is possible to effectively restrain frictions to be caused between the cage 40 and the inner peripheral surface 11 of the outer joint member 310 and between the cage 40 and the outer peripheral surface 21 of the inner joint member 320.

Figure 12:
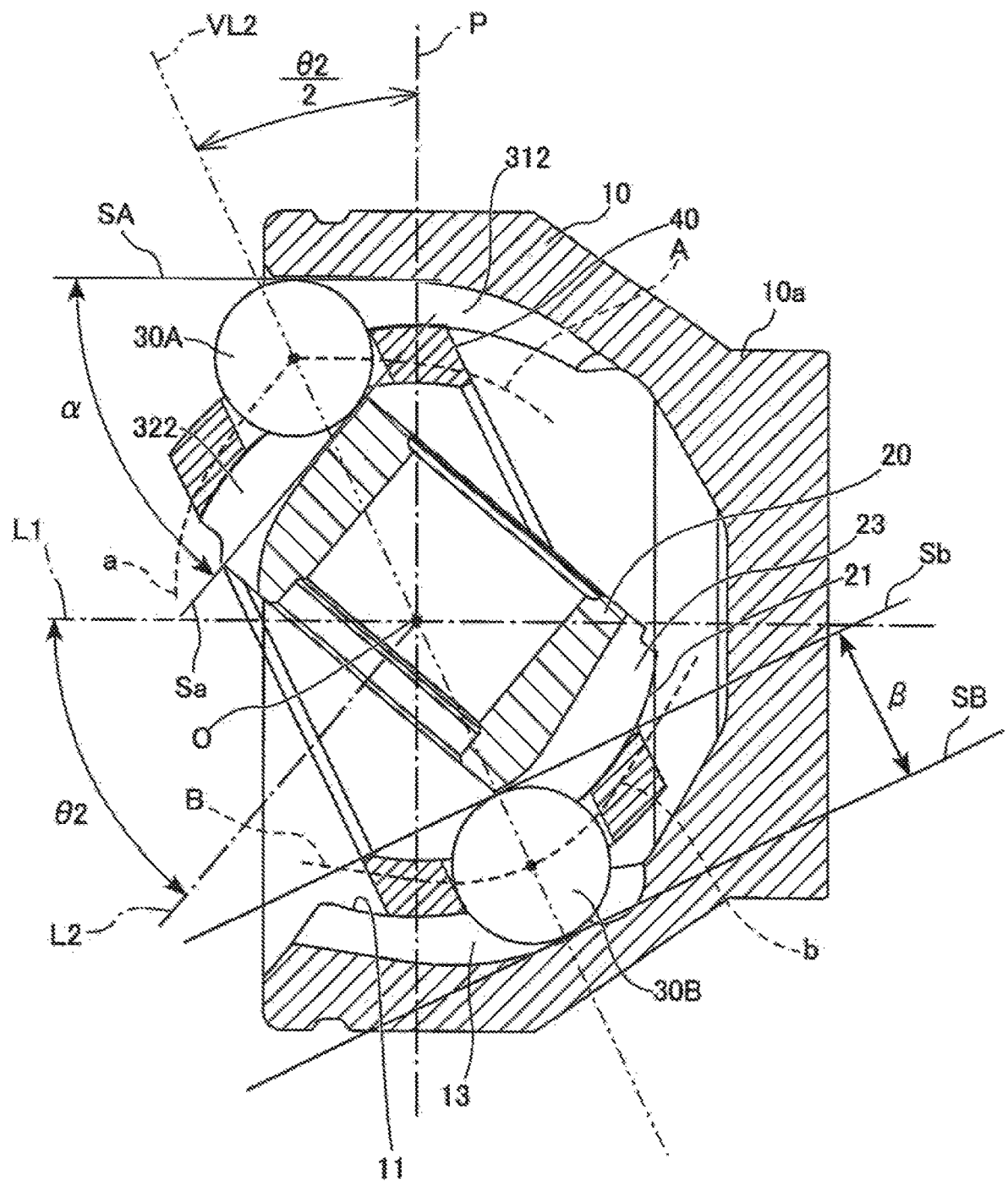
FIG. 12 is a view illustrating an axial section of the constant velocity joint at the time when the joint angle is a maximum movable angle.

With reference to FIG. 12, an operation mode of the constant velocity joint 300 is described. FIG. 12 illustrates the constant velocity joint 300 at the time when the center of the second ball 30B is placed closer to the bottom side of the outer joint member 310 than the joint center O is and the joint angle is the maximum movable angle θ2.

As illustrated in FIG. 12, in the constant velocity joint 300, while the center of the second ball 30B is moving from the joint center O to the position of the maximum movable angle θ2 on the bottom side of the outer joint member 310 (toward the movable-angle virtual line VL2), the second open angle β is maintained in a state where the second open angle β faces the bottom side of the outer joint member 310. In the constant velocity joint 300, when the joint angle is the maximum movable angle θ2, the second open angle β is zero degrees (the straight line SB is parallel to the straight line Sb). That is, while the center of the second ball 30B is moving from the joint center O to the position of the maximum movable angle θ2 on the bottom side of the outer joint member 310 in the central-axis-L1 direction of the outer joint member 310 (the position on the movable-angle virtual line VL2 inclined toward the bottom side of the outer joint member 310), the second open angle β is not reversed from the state where the second open angle β faces the bottom side of the outer joint member 310 to a state where the second open angle β faces the opening side thereof.

In the meantime, in the constant velocity joint 300, while the center of the first ball 30A is moving to the position of the maximum movable angle θ2 on the opening side of the outer joint member 310 (toward the movable-angle virtual line VL2) in the central-axis-L1 direction of the outer joint member 310, the first open angle α is maintained in a state where the first open angle α faces the opening side of the outer joint member 310.

Accordingly, in the constant velocity joint 300, while the center of the second ball 30B is moving from the joint center O to the position of the maximum movable angle θ2 on the bottom side of the outer joint member 310 in the central-axis-L1 direction of the outer joint member 310, the force applied to the first ball 30A and the force applied to the second ball 30B cancel each other. Accordingly, in the constant velocity joint 300, it is possible to restrain frictions to be caused between the cage 40 and the inner peripheral surface 11 of the outer joint member 310 and between the cage 40 and the outer peripheral surface 21 of the inner joint member 320.

Thus, in the constant velocity joint 300, even in a state where the joint angle is large, it is possible to restrain frictions to be caused between the cage 40 and the inner peripheral surface 11 of the outer joint member 310 and between the cage 40 and the outer peripheral surface 21 of the inner joint member 320. As a result, in the constant velocity joint 300, it is possible to restrain a mechanical loss caused at the time of transmitting a torque between the outer joint member 310 and the inner joint member 320.

3. Modifications about Second Outer Bottom Side Portion 132

Figure 13:
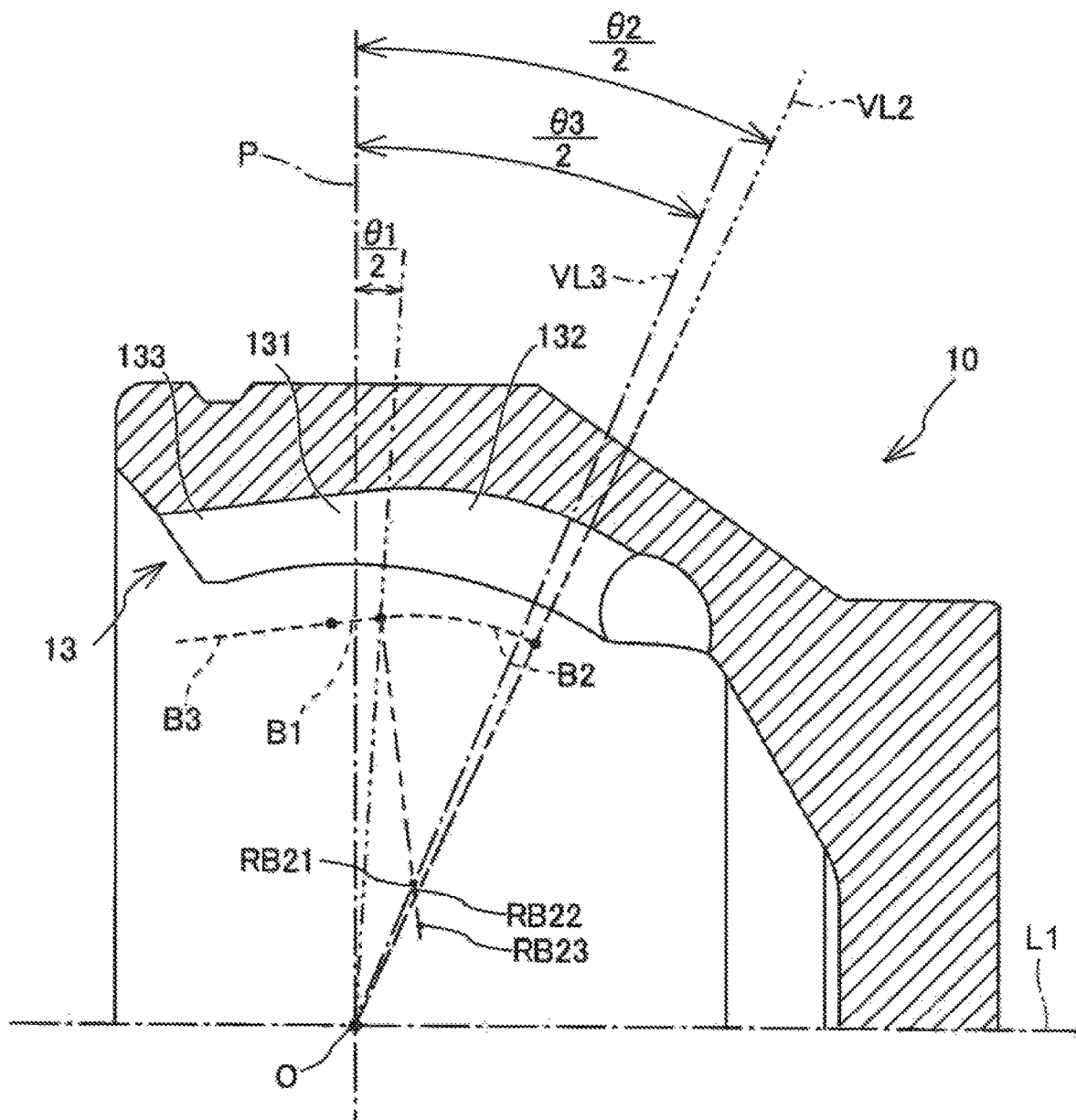
FIG. 13 is a view illustrating modifications related to an arc center of a center locus of a second ball rolling on a second outer bottom side portion.

With reference to FIG. 13, the following describes modifications about the second outer bottom side portion 132. Note that FIG. 13 illustrates the outer joint member 10 in the first embodiment as illustrated in FIG. 4, but the modifications shown below are applicable to the first embodiment and the second embodiment. In the following, a maximum joint angle of the constant velocity joint used in a state where the constant velocity joint is provided in the vehicle is defined as a maximum use angle θ3. Further, a virtual line that connects the center of the first ball 30A (the second ball 30B) at the time when the joint angle is the maximum use angle θ3 to the joint center O is defined as a use-angle virtual line VL3.

First described is a first modification. As illustrated in FIG. 13, in the first modification, an arc center point RB21 of a center locus (not shown) of the second ball 30B rolling on the second outer bottom side portion 132 is disposed on the use-angle virtual line VL3 inclined toward the bottom side of the outer joint member 10 in FIG. 13. Further, the arc center point RB21 is disposed at an intersection between the use-angle virtual line VL3 and a line perpendicular to the center locus B1 at the connecting position between the center locus B1 of the second ball 30B rolling on the second outer central portion 131 and the center locus of the second ball 30B rolling on the second outer bottom side portion 132. In this case, when the joint angle is the maximum use angle θ3, the second open angle β is zero degrees (the tangent of the center locus of the second ball 30B rolling on the second outer ball groove 13 at the center of the second ball 30B is parallel to the tangent of the center locus of the second ball 30B rolling on the second inner ball groove 23 at the center of the second ball 30B).

In this case, while the center of the second ball 30B is moving from the joint center O to a position of the maximum use angle θ3 on the bottom side of the outer joint member 10 in the central-axis-L1 direction of the outer joint member 10 (while the center of the second ball 30B is disposed between the plane P and the use-angle virtual line VL3 in FIG. 13), the second open angle β is not reversed from a state where the second open angle β faces the bottom side (the right side in FIG. 13) of the outer joint member 10 to a state where the second open angle β faces the opening side (the left side in FIG. 13) thereof. That is, in the constant velocity joint in the first modification, when the joint angle is the maximum use angle θ3 or less, the second open angle β is not reversed.

Next will be described a second modification. In the second modification, an arc center point RB22 of a center locus (not shown) of the second ball 30B rolling on the second outer bottom side portion 132 is disposed closer to the bottom side of the outer joint member 10 than the use-angle virtual line VL3 is and the arc center point RB22 of a center locus (not shown) of the second ball 30B rolling on the second outer bottom side portion 132 is disposed closer to the opening side of the outer joint member 10 than the movable-angle virtual line VL2 is. Further, the arc center point RB22 is disposed on the line perpendicular to the center locus B1 at the connecting position between the center locus B1 of the second ball 30B rolling on the second outer central portion 131 and the center locus of the second ball 30B rolling on the second outer bottom side portion 132.

In this case, at least while the center of the second ball 30B is moving from the joint center O to the position of the maximum use angle θ3 on the bottom side of the outer joint member 10 in the central-axis-L1 direction of the outer joint member 10 (while the center of the second ball 30B is disposed between the plane P and the use-angle virtual line VL3 in FIG. 13), the second open angle β is maintained in a state where the second open angle β faces the bottom side of the outer joint member 10. That is, in the constant velocity joint of the second modification, at least when the joint angle is the maximum use angle θ3 or less, a force to move the second ball 30B toward the bottom side of the outer joint member 10 can be applied to the second ball 30B.

Next will be described a third modification. In the third modification, an arc center point RB23 of a center locus of the second ball 30B rolling on the second outer bottom side portion 132 is disposed closer to the bottom side of the outer joint member 10 than the movable-angle virtual line VL2 is. Further, the arc center point RB23 is disposed on the line perpendicular to the center locus B1 at the connecting position between the center locus B1 of the second ball 30B rolling on the second outer central portion 131 and the center locus of the second ball 30B rolling on the second outer bottom side portion 132.

In this case, while the center of the second ball 30B is moving from the joint center O to the position of the maximum movable angle θ2 on the bottom side of the outer joint member 10 in the central-axis-L1 direction of the outer joint member 10 (while the center of the second ball 30B is disposed between the plane P and the movable-angle virtual line VL2 in FIG. 13), the second open angle β is maintained in a state where the second open angle β faces the bottom side of the outer joint member 10. That is, in the constant velocity joint of the third modification, when the joint angle is the maximum movable angle θ2 or less, a force to move the second ball 30B toward the bottom side of the outer joint member 10 can be applied to the second ball 30B.

As described above, in the constant velocity joint in each of the first modification to the third modification, even in a state where the joint angle is large, it is possible to restrain frictions to be caused between the cage 40 and the inner peripheral surface 11 of the outer joint member 10 and between the cage 40 and the outer peripheral surface 21 of the inner joint member 20. As a result, in the constant velocity joint, it is possible to restrain a mechanical loss caused at the time of transmitting a torque between the outer joint member 10 and the inner joint member 20.

4. Others

The present disclosure has been described above based on the embodiments. However, the present disclosure is not limited to the embodiments, and it can be easily inferred that various modifications and alterations are performable without deviating from the gist of the present disclosure. Further, the values used in the embodiments are examples, and it is naturally possible to apply other values.

5. Effects

As described above, the constant velocity joint 100, 300 is a joint-center-fixed constant velocity joint configured to be provided in a vehicle, and includes: the outer joint member 10, 310 formed in a bottomed tubular shape opened on the first side in the central-axis direction, the outer joint member 10, 310 including the inner peripheral surface 11 having the first outer ball groove 12, 312 and the second outer ball groove 13, 313; the inner joint member 20, 320 placed inwardly from the outer joint member 10, 310 and including the outer peripheral surface 21 having the first inner ball groove 22, 322 corresponding to the first outer ball groove 12, 312 and the second inner ball groove 23, 323 corresponding to the second outer ball groove 13, 313; the first ball 30A placed between the first outer ball groove 12, 312 and the first inner ball groove 22, 322; the second ball 30B placed between the second outer ball groove 13, 313 and the second inner ball groove 23, 323; and the cage 40 placed between the inner peripheral surface 11 of the outer joint member 10, 310 and the outer peripheral surface 21 of the inner joint member 20, 320, the cage 40 including the window portions 41 in each of which a corresponding one of the first ball 30A and the second ball 30B is accommodated.

The maximum joint angle of the constant velocity joint 100, 300 used in a state where the constant velocity joint 100, 300 is provided in the vehicle is defined as the maximum use angle θ3. An angle formed between the center locus A of the first ball 30A rolling on the first outer ball groove 12, 312 and the center locus a of the first ball 30A rolling on the first inner ball groove 22, 322 is defined as the first open angle α, the first open angle α being on the side where a distance between the first outer ball groove 12, 312 and the first inner ball groove 22, 322 expands. Further, an angle formed between the center locus B of the second ball 30B rolling on the second outer ball groove 13, 313 and the center locus b of the second ball 30B rolling on the second inner ball groove 23, 323 is defined as the second open angle β, the second open angle β being on the side where a distance between the second outer ball groove 13, 313 and the second inner ball groove 23, 323 expands.

When the center of the first ball 30A is placed at the same position as the joint center O in the central-axis-L1 direction of the outer joint member 10, 310, the first open angle α faces the opening side of the outer joint member 10, 310. Further, while the center of the first ball 30A is moving to a position of the maximum use angle θ3 on the opening side of the outer joint member 10, 310 from the joint center O, the first open angle α faces the opening side of the outer joint member 10, 310.

When the center of the second ball 30B is placed at the same position as the joint center O in the central-axis-L1 direction of the outer joint member 10, 310, the second open angle β faces the bottom side of the outer joint member 10, 310. Further, while the center of the second ball 30B is moving to a position of the maximum use angle θ3 on the bottom side of the outer joint member 10, 310 from the joint center O, the second open angle β is not reversed from a state where the second open angle β faces the bottom side of the outer joint member 10, 310 to a state where the second open angle β faces the opening side of the outer joint member 10, 310.

In the constant velocity joint 100, 300, while the center of the second ball 30B is moving to the position of the maximum use angle θ3 on the bottom side of the outer joint member 10, 310 from the joint center O, it is possible to prevent a force applied to the second ball 30B from being reversed from a state where the force is directed toward the bottom side of the outer joint member 10, 310 to a state where the force is directed toward the opening side thereof. Thus, in a state where the constant velocity joint 100, 300 is provided in the vehicle, even if the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, a joint angle of the constant velocity joint 100, 300 at the time when its movement is restricted by the stopper structure of the constant velocity joint 100, 300 itself is defined as the maximum movable angle θ2. While the center of the first ball 30A is moving to a position of the maximum movable angle θ2 on the opening side of the outer joint member 10, 310 from the joint center O, the first open angle α faces the opening side of the outer joint member 10, 310. While the center of the second ball 30B is moving to a position of the maximum movable angle θ2 on the bottom side of the outer joint member 10, 310 from the joint center O, the second open angle β is not reversed from the state where the second open angle β faces the bottom side of the outer joint member 10, 310 to the state where the second open angle β faces the opening side of the outer joint member 10, 310.

In the constant velocity joint 100, 300, while the second open angle β is facing the bottom side of the outer joint member 10, 310 and the center of the second ball 30B is moving to the position of the maximum movable angle θ2 on the bottom side of the outer joint member 10, 310 from the joint center O, it is possible to prevent a force to be applied to the second ball 30B from being reversed. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, the second outer ball groove 13, 313 includes: the second outer central portion 131, 431 provided in a range including the joint center O in the central-axis-L1 direction of the outer joint member 10, 310; and the second outer bottom side portion 132 provided closer to the bottom side of the outer joint member 10, 310 than the second outer central portion 131, 431 is.

The center locus B1, B11 of the second ball 30B rolling on the second outer central portion 131, 431 is disposed such that its distance from the central axis L1 of the outer joint member 10, 310 increases toward the bottom side of the outer joint member 10, 310. The center locus B2 of the second ball 30B rolling on the second outer bottom side portion 132 is formed in an arc shape and disposed in the outer joint member 10, 310 at a position radially inwardly from the tangent TB at a connecting position between the second outer central portion 131, 431 and the second outer bottom side portion 132, the tangent extending in the second outer bottom side portion 132.

In the constant velocity joint 100, 300, it is possible to downsize the outer joint member 10, 310 and to sufficiently secure the thickness of the outer joint member 10, 310 in the part where the second outer bottom side portion 132 is formed. Accordingly, in the constant velocity joint 100, 300, it is possible to improve the durability of the outer joint member 10, 310.

In the constant velocity joint 100, 300, the center locus B2 of the second ball 30B rolling on the second outer bottom side portion 132 is formed in an arc shape having a predetermined arc center point RB2. The predetermined arc center point RB2 of the center locus B2 of the second ball 30B rolling on the second outer bottom side portion 132 is disposed between the central axis L1 of the outer joint member 10, 310 and the second outer ball groove 13, 313. In the constant velocity joint 100, 300, it is possible to downsize the outer joint member 10, 310.

In the constant velocity joint 100, 300, a virtual line that connects the center of the second ball 30B at the time when the joint angle of the constant velocity joint 100, 300 is the maximum use angle θ3 to the joint center O is defined as the use-angle virtual line VL3. The predetermined arc center point RB2, RB21, RB22, RB23 of the center locus B2 of the second ball 30B rolling on the second outer bottom side portion 132 is disposed on the use-angle virtual line VL3 or at a position closer to the bottom side of the outer joint member 10, 310 than the use-angle virtual line VL3 is.

In the constant velocity joint 100, 300, when the joint angle is the maximum use angle θ3, it is possible to prevent the second open angle β from being reversed. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, a virtual line that connects the center of the second ball 30B at the time when the joint angle of the constant velocity joint 100, 300 is the maximum movable angle θ2 to the joint center O is defined as the movable-angle virtual line VL2. The predetermined arc center point RB2, RB23 of the center locus B2 of the second ball 30B rolling on the second outer bottom side portion 132 is disposed on the movable-angle virtual line VL2 or at a position closer to the bottom side of the outer joint member 10, 310 than the movable-angle virtual line VL2 is.

In the constant velocity joint 100, 300, when the joint angle is the maximum movable angle θ2, it is possible to prevent the second open angle β from being reversed. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, a maximum joint angle used at a time when the vehicle travels straight is defined as the maximum commonly used angle θ1. The connecting position between the center locus B2 of the second ball 30B rolling on the second outer bottom side portion 132 and the center locus B1, B11 of the second ball 30B rolling on the second outer central portion 131, 431 is disposed at a position of the maximum commonly used angle θ1.

Here, in the constant velocity joint 100, 300, when the center of the second ball 30B is disposed near the joint center O in the central-axis-L1 direction of the outer joint member 10, 310, the second open angle β is large. That is, in the constant velocity joint 100, 300, in a state where the second ball 30B rolls on the second outer central portion 131, 431, a force to move the second ball 30B toward the bottom side of the outer joint member 10, 310 becomes large.

In this regard, in the constant velocity joint 100, 300, the second ball 30B rolls on the second outer central portion 131, 431 at the time when the vehicle travels straight, thereby making it possible to increase the frequency at which the second ball 30B rolls on the second outer central portion 131, 431. Accordingly, at the time when the constant velocity joint 100, 300 is provided in the vehicle, the force applied to the first ball 30A can be effectively canceled by the force applied to the second ball 30B. As a result, in the constant velocity joint 100, 300, it is possible to effectively restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, the maximum commonly used angle θ1 is 8 degrees or less. With the constant velocity joint 100, 300, it is possible to prevent the connecting position between the center locus B2 of the second ball 30B rolling on the second outer bottom side portion 132 and the center locus B1, B11 of the second ball 30B rolling on the second outer central portion 131, 431 from being largely distanced from the joint center O in the central-axis-L1 direction of the outer joint member 10, 310. As a result, in the constant velocity joint 100, 300, it is possible to downsize the outer joint member 10, 310 in the central-axis-L1 direction.

In the constant velocity joint 100, 300, the first outer ball groove 12, 312 includes the first outer central portion 121, 421 provided in a range including the joint center O in the central-axis-L1 direction of the outer joint member 10, 310. The center locus A1, A11 of the first ball 30A rolling on the first outer central portion 121, 421 is formed in a shape obtained by reversing, with respect to the plane P, the center locus B1, B11 of the second ball 30B rolling on the second outer central portion 131, 431. The plane P is perpendicular to the central axis L1 of the outer joint member 10, 310 and extends through the joint center O.

In the constant velocity joint 100, 300, in a state where the first ball 30A rolls on the first outer central portion 121, 421 and the second ball 30B rolls on the second outer central portion 131, 431, the force applied to the first ball 30A and the force applied to the second ball 30B can effectively cancel each other. Accordingly, in the constant velocity joint 100, 300, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, in a whole range where the center of the first ball 30A moves from the position of the maximum use angle θ3 on the opening side of the outer joint member 10, 310 to the position of the maximum use angle θ3 on the bottom side of the outer joint member 10, 310 in the central-axis-L1 direction of the outer joint member 10, 310, the first open angle α faces the opening side of the outer joint member 10, 310. In the constant velocity joint 100, 300, it is possible to apply, to the first ball 30A, a force to move the first ball 30A toward the opening side of the outer joint member 10, 310 in the central-axis-L1 direction of the outer joint member 10, 310 in the whole range where the center of the first ball 30A is disposed from the position of the maximum use angle θ3 on the opening side of the outer joint member 10, 310 to the position of the maximum use angle θ3 on the bottom side of the outer joint member 10, 310 in the central-axis-L1 direction of the outer joint member 10, 310.

In the constant velocity joint 100, 300, the first outer ball groove 12, 312 includes the first outer bottom side portion 122 provided closer to the bottom side of the outer joint member 10, 310 than the first outer central portion 121, 421 is. The center locus A2 of the first ball 30A rolling on the first outer bottom side portion 122 is formed in an arc shape having a predetermined arc center point RA2. The predetermined arc center point RA2 in the first outer bottom side portion 122 is placed between the central axis L1 of the outer joint member 10, 310 and the first outer ball groove 12, 312. In the constant velocity joint 100, 300, it is possible to downsize the outer joint member 10, 310.

The constant velocity joint 100, 300 is provided in a front drive shaft provided in the vehicle. Here, a constant velocity joint used for a front drive shaft requires a large joint angle at the time of use in comparison with a constant velocity joint used for a rear drive shaft. In terms of this, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320. As a result, in the constant velocity joint 100, 300, it is possible to enhance a function of the front drive shaft.

In the constant velocity joint 100, 300, while the center of the second ball 30B is moving to the position of the maximum use angle θ3 on the bottom side of the outer joint member 10, 310 from the joint center O, the second open angle β is maintained in the state where the second open angle β faces the bottom side of the outer joint member 10, 310.

With the constant velocity joint 100, 300, when the joint angle is the maximum use angle θ3 or less, a force to move the second ball 30B toward the bottom side of the outer joint member 10, 310 can be applied to the second ball 30B. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, while the center of the second ball 30B is moving to the position of the maximum use angle θ3 on the bottom side of the outer joint member 10, 310 from the joint center O, a range of the second open angle β includes 0°.

In the constant velocity joint 100, 300, when the joint angle is the maximum use angle θ3, it is possible to prevent the second open angle β from being reversed. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, while the center of the second ball 30B is moving to the position of the maximum movable angle θ2 on the bottom side of the outer joint member 10, 310 from the joint center O, the second open angle β is maintained in the state where the second open angle β faces the bottom side of the outer joint member 10, 310.

In the constant velocity joint 100, 300, when the joint angle is the maximum movable angle θ2 or less, a force to move the second ball 30B toward the bottom side of the outer joint member 10, 310 can be applied to the second ball 30B. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

In the constant velocity joint 100, 300, while the center of the second ball 30B is moving to the position of the maximum movable angle θ2 on the bottom side of the outer joint member 10, 310 from the joint center O, a range of the second open angle β includes 0°.

In the constant velocity joint 100, 300, when the joint angle is the maximum movable angle θ2, it is possible to prevent the second open angle β from being reversed. Thus, in the constant velocity joint 100, 300, even in a state where the joint angle is large, it is possible to restrain frictions to be caused between the cage 40 and the inner peripheral surface 11 of the outer joint member 10, 310 and between the cage 40 and the outer peripheral surface 21 of the inner joint member 20, 320.

What is claimed is:

1. A joint-center-fixed constant velocity joint configured to be provided in a vehicle, the constant velocity joint comprising:
    an outer joint member having a bottomed tubular shape opened on one side in a central-axis direction, the outer joint member including an inner peripheral surface having a first outer ball groove and a second outer ball groove;
    an inner joint member placed inwardly from the outer joint member and including an outer peripheral surface having a first inner ball groove corresponding to the first outer ball groove and a second inner ball groove corresponding to the second outer ball groove;
    a first ball placed between the first outer ball groove and the first inner ball groove;
    a second ball placed between the second outer ball groove and the second inner ball groove; and
    a cage placed between the inner peripheral surface of the outer joint member and the outer peripheral surface of the inner joint member, the cage including a plurality of window portions in each of which a corresponding one of the first ball and the second ball is accommodated, wherein:
    a maximum joint angle of the constant velocity joint is defined as a maximum use angle;
    an angle formed between a center locus of the first ball rolling on the first outer ball groove and a center locus of the first ball rolling on the first inner ball groove is defined as a first open angle, the first open angle being on a side where a distance between the first outer ball groove and the first inner ball groove expands;

an angle formed between a center locus of the second ball rolling on the second outer ball groove and a center locus of the second ball rolling on the second inner ball groove is defined as a second open angle, the second open angle being on a side where a distance between the second outer ball groove and the second inner ball groove expands;
when a center of the first ball is placed at the same position as a joint center in the central-axis direction of the outer joint member, the first open angle faces an opening side of the outer joint member;
while the center of the first ball is moving to a position of the maximum use angle on the opening side of the outer joint member from the joint center, the first open angle faces the opening side of the outer joint member;
when a center of the second ball is placed at the same position as the joint center in the central-axis direction of the outer joint member, the second open angle faces a bottom side of the outer joint member;
while the center of the second ball is moving to a position of the maximum use angle on the bottom side of the outer joint member from the joint center, the second open angle is not reversed from a state where the second open angle faces the bottom side of the outer joint member to a state where the second open angle faces the opening side of the outer joint member;
the second outer ball groove includes
a second outer central portion provided in a range including the joint center in the central-axis direction of the outer joint member, and
a second outer bottom side portion provided closer to the bottom side of the outer joint member than the second outer central portion is;
a center locus of the second ball rolling on the second outer central portion is disposed such that a distance from the central axis of the outer joint member increases toward the bottom side of the outer joint member; and
a center locus of the second ball rolling on the second outer bottom side portion is formed in an arc shape and disposed in the outer joint member at a position radially inwardly from a tangent at a connecting position between the second outer central portion and the second outer bottom side portion, the tangent extending in the second outer bottom side portion.

2. The constant velocity joint according to claim 1, wherein:
a joint angle of the constant velocity joint at a time when movement of the constant velocity joint is restricted by a stopper structure of the constant velocity joint itself is defined as a maximum movable angle;
while the center of the first ball is moving to a position of a maximum movable angle on the opening side of the outer joint member from the joint center, the first open angle faces the opening side of the outer joint member; and
while the center of the second ball is moving to a position of the maximum movable angle on the bottom side of the outer joint member from the joint center, the second open angle is not reversed from the state where the second open angle faces the bottom side of the outer joint member to the state where the second open angle faces the opening side of the outer joint member.

3. The constant velocity joint according to claim 2, wherein, while the center of the second ball is moving to the position of the maximum movable angle on the bottom side of the outer joint member from the joint center, the second open angle is maintained in the state where the second open angle faces the bottom side of the outer joint member.

4. The constant velocity joint according to claim 2, wherein, while the center of the second ball is moving to the position of the maximum movable angle on the bottom side of the outer joint member from the joint center, a range of the second open angle includes 0°.

5. The constant velocity joint according to claim 1, wherein:
the center locus of the second ball rolling on the second outer bottom side portion is formed in an arc shape having a predetermined arc center point; and
the predetermined arc center point of the center locus of the second ball rolling on the second outer bottom side portion is disposed between the central axis of the outer joint member and the second outer ball groove.

6. The constant velocity joint according to claim 5, wherein:
a virtual line that connects the center of the second ball at a time when the joint angle of the constant velocity joint is the maximum use angle to the joint center is defined as a use-angle virtual line; and
the predetermined arc center point of the center locus of the second ball rolling on the second outer bottom side portion is disposed on the use-angle virtual line or at a position closer to the bottom side of the outer joint member than the use-angle virtual line is.

7. The constant velocity joint according to claim 1, wherein:
a connecting position between the center locus of the second ball rolling on the second outer bottom side portion and the center locus of the second ball rolling on the second outer central portion is disposed at a position of a maximum commonly used angle.

8. The constant velocity joint according to claim 7, wherein the maximum commonly used angle is 8 degrees or less.

9. The constant velocity joint according to claim 1, wherein:
the first outer ball groove includes a first outer central portion provided in a range including the joint center in the central-axis direction of the outer joint member; and
a center locus of the first ball rolling on the first outer central portion is formed in a shape obtained by reversing, with respect to a plane, the center locus of the second ball rolling on the second outer central portion, the plane extending through the joint center, and being perpendicular to the central axis of the outer joint member.

10. The constant velocity joint according to claim 9, wherein, in a whole range where the center of the first ball moves from the position of the maximum use angle on the opening side of the outer joint member to a position of the maximum use angle on the bottom side of the outer joint member in the central-axis direction of the outer joint member, the first open angle faces the opening side of the outer joint member.

11. The constant velocity joint according to claim 9, wherein:
the first outer ball groove includes a first outer bottom side portion provided closer to the bottom side of the outer joint member than the first outer central portion is;
a center locus of the first ball rolling on the first outer bottom side portion is formed in an arc shape having a predetermined arc center point; and the predetermined arc center point in the first outer bottom side portion is disposed between the central axis of the outer joint member and the first outer ball groove.

12. The constant velocity joint according to claim 1, wherein, while the center of the second ball is moving to the position of the maximum use angle on the bottom side of the outer joint member from the joint center, the second open angle is maintained in the state where the second open angle faces the bottom side of the outer joint member.

13. The constant velocity joint according to claim 1, wherein, while the center of the second ball is moving to the position of the maximum use angle on the bottom side of the outer joint member from the joint center, a range of the second open angle includes 0°.

* * * * *